United States Patent
Hill et al.

(10) Patent No.: US 10,389,628 B2
(45) Date of Patent: Aug. 20, 2019

(54) EXPOSING A SUBSET OF HOSTS ON AN OVERLAY NETWORK TO COMPONENTS EXTERNAL TO THE OVERLAY NETWORK WITHOUT EXPOSING ANOTHER SUBSET OF HOSTS ON THE OVERLAY NETWORK

(71) Applicant: Oracle International Corporation, Redwood Shores, CA (US)

(72) Inventors: Peter John Hill, Seattle, WA (US); David Allen McArthur, Seattle, WA (US); Jagwinder Singh Brar, Bellevue, WA (US); Vivek Bhanu, Bothell, WA (US); Chris Higgins, Sammamish, WA (US)

(73) Assignee: Oracle International Corporation, Redwood Shores, CA (US)

( * ) Notice: Subject to any disclaimer, the term of this patent is extended or adjusted under 35 U.S.C. 154(b) by 223 days.

(21) Appl. No.: 15/256,361

(22) Filed: Sep. 2, 2016

(65) Prior Publication Data
US 2018/0069787 A1   Mar. 8, 2018

(51) Int. Cl.
*H04L 12/715* (2013.01)
*H04L 12/813* (2013.01)
(Continued)

(52) U.S. Cl.
CPC ............. *H04L 45/64* (2013.01); *H04L 12/66* (2013.01); *H04L 45/02* (2013.01)

(58) Field of Classification Search
CPC .......... H04L 45/64; H04L 12/66; H04L 45/02
See application file for complete search history.

(56) References Cited

U.S. PATENT DOCUMENTS

| 7,299,038 B2 | 11/2007 | Kennedy et al. |
| 7,382,765 B2 | 6/2008 | Kennedy et al. |

(Continued)

FOREIGN PATENT DOCUMENTS

| CN | 102857475 A | 1/2013 |
| CN | 103036703 A | 4/2013 |

(Continued)

OTHER PUBLICATIONS

Cavdar, Cicek, "Optical Networks Virtual Topology Design", Optical Networks Lab (ON Lab), Royal Institute of Technology, Sep. 5, 2012, 69 pages.

(Continued)

*Primary Examiner* — Huy D Vu
*Assistant Examiner* — Bailor C. Hsu
(74) *Attorney, Agent, or Firm* — Invoke

(57) ABSTRACT

Techniques for exposing a subset of hosts on an overlay network, without exposing another subset of hosts on the overlay network, are disclosed. A component associated with an overlay network exposes a subset of hosts on the overlay network to components external to the overlay network. The component exposes the subset of hosts by distributing a mapping between (a) the hosts to-be-exposed and (b) the substrate addresses associated with the hosts. Alternatively, a component external to an overlay network exposes a subset of hosts on the overlay network to additional components external to the overlay network. The component exposes the subset of hosts by distributing a mapping between (a) the hosts to-be-exposed and (b) a substrate address associated with the particular component. In either embodiment, a mapping for hosts to-be-hidden is not distributed.

20 Claims, 12 Drawing Sheets

(51) Int. Cl.
*H04L 12/46* (2006.01)
*H04L 12/66* (2006.01)
*H04L 12/751* (2013.01)

(56) References Cited

U.S. PATENT DOCUMENTS

| | | | |
|---|---|---|---|
| 7,453,864 B2 | 11/2008 | Kennedy et al. | |
| 7,602,782 B2* | 10/2009 | Doviak | H04L 12/5692 370/389 |
| 7,813,263 B2 | 10/2010 | Chang et al. | |
| 7,958,087 B2 | 6/2011 | Blumenau | |
| 8,224,971 B1* | 7/2012 | Miller | H04L 12/4641 370/254 |
| 8,549,347 B1 | 10/2013 | Brandwine et al. | |
| 8,640,220 B1* | 1/2014 | Vincent | G06F 9/5027 726/13 |
| 9,112,777 B1 | 8/2015 | Barclay et al. | |
| 9,274,811 B1 | 3/2016 | Reeves et al. | |
| 9,450,817 B1* | 9/2016 | Bahadur | H04L 45/64 |
| 9,806,948 B2* | 10/2017 | Masurekar | G06F 17/30557 |
| 9,825,822 B1* | 11/2017 | Holland | H04L 41/50 |
| 9,952,908 B2 | 4/2018 | Nedeltchev et al. | |
| 9,979,602 B1 | 5/2018 | Chinnakannan et al. | |
| 10,013,170 B1 | 7/2018 | Sahin et al. | |
| 10,116,732 B1 | 10/2018 | Canton et al. | |
| 10,142,183 B2 | 11/2018 | Cohn et al. | |
| 10,218,597 B1 | 2/2019 | Miller et al. | |
| 2003/0189930 A1 | 10/2003 | Terrell et al. | |
| 2004/0044758 A1 | 3/2004 | Palmer et al. | |
| 2007/0112578 A1 | 5/2007 | Randle et al. | |
| 2007/0220203 A1 | 9/2007 | Murase | |
| 2009/0182915 A1 | 7/2009 | Farrell et al. | |
| 2009/0248896 A1* | 10/2009 | Cohn | H04L 29/12028 709/245 |
| 2011/0022795 A1 | 1/2011 | Murase | |
| 2012/0210066 A1 | 8/2012 | Joshi et al. | |
| 2013/0163601 A1 | 6/2013 | Kim et al. | |
| 2013/0211870 A1 | 8/2013 | Lawson et al. | |
| 2013/0212420 A1 | 8/2013 | Lawson et al. | |
| 2013/0218909 A1 | 8/2013 | Chu et al. | |
| 2014/0098673 A1 | 4/2014 | Lee et al. | |
| 2014/0195689 A1 | 7/2014 | Gill et al. | |
| 2014/0207861 A1 | 7/2014 | Brandwine et al. | |
| 2015/0074450 A1 | 3/2015 | Blount et al. | |
| 2015/0095448 A1 | 4/2015 | Hwang | |
| 2015/0193317 A1 | 7/2015 | Firley | |
| 2015/0195137 A1* | 7/2015 | Kashyap | H04L 41/0893 370/254 |
| 2015/0237117 A1 | 8/2015 | Taylor | |
| 2015/0244617 A1 | 8/2015 | Nakil et al. | |
| 2015/0304176 A1 | 10/2015 | Ting et al. | |
| 2015/0339150 A1 | 11/2015 | Yanagisawa et al. | |
| 2015/0379429 A1 | 12/2015 | Lee et al. | |
| 2016/0080496 A1 | 3/2016 | Falanga et al. | |
| 2016/0094643 A1 | 3/2016 | Jain et al. | |
| 2016/0105893 A1 | 4/2016 | Senarath et al. | |
| 2016/0112497 A1 | 4/2016 | Koushik et al. | |
| 2016/0132214 A1 | 5/2016 | Koushik et al. | |
| 2016/0132310 A1 | 5/2016 | Koushik et al. | |
| 2016/0134558 A1 | 5/2016 | Steinder et al. | |
| 2016/0218918 A1 | 7/2016 | Chu et al. | |
| 2016/0323377 A1 | 11/2016 | Einkauf et al. | |
| 2016/0364382 A1 | 12/2016 | Sarikaya | |
| 2017/0063613 A1 | 3/2017 | Bloch et al. | |
| 2017/0180154 A1 | 6/2017 | Duong et al. | |
| 2017/0302565 A1 | 10/2017 | Ghobadi et al. | |
| 2018/0041398 A1 | 2/2018 | Cohn et al. | |
| 2018/0062932 A1 | 3/2018 | Cohn et al. | |
| 2018/0107561 A1 | 4/2018 | Bender et al. | |
| 2018/0107563 A1 | 4/2018 | Bender et al. | |
| 2018/0139099 A1 | 5/2018 | Amin | |
| 2018/0159801 A1 | 6/2018 | Rajan et al. | |
| 2018/0205673 A1 | 7/2018 | Jain et al. | |
| 2018/0234298 A1 | 8/2018 | Cohn et al. | |
| 2018/0234322 A1 | 8/2018 | Cohn et al. | |
| 2018/0316594 A1 | 11/2018 | Wu et al. | |

FOREIGN PATENT DOCUMENTS

| | | |
|---|---|---|
| CN | 104301321 A | 1/2015 |
| CN | 104518897 A | 4/2015 |
| CN | 104660553 A | 5/2015 |
| JP | 2012-243254 A | 12/2012 |
| JP | 2015-172964 A | 10/2015 |

OTHER PUBLICATIONS

"Comparison of Firewalls," Wikipedia, available at https://en.wikipedia.org/wiki/Comparison_of_firewalls (accessed on May 6, 2016).

* cited by examiner

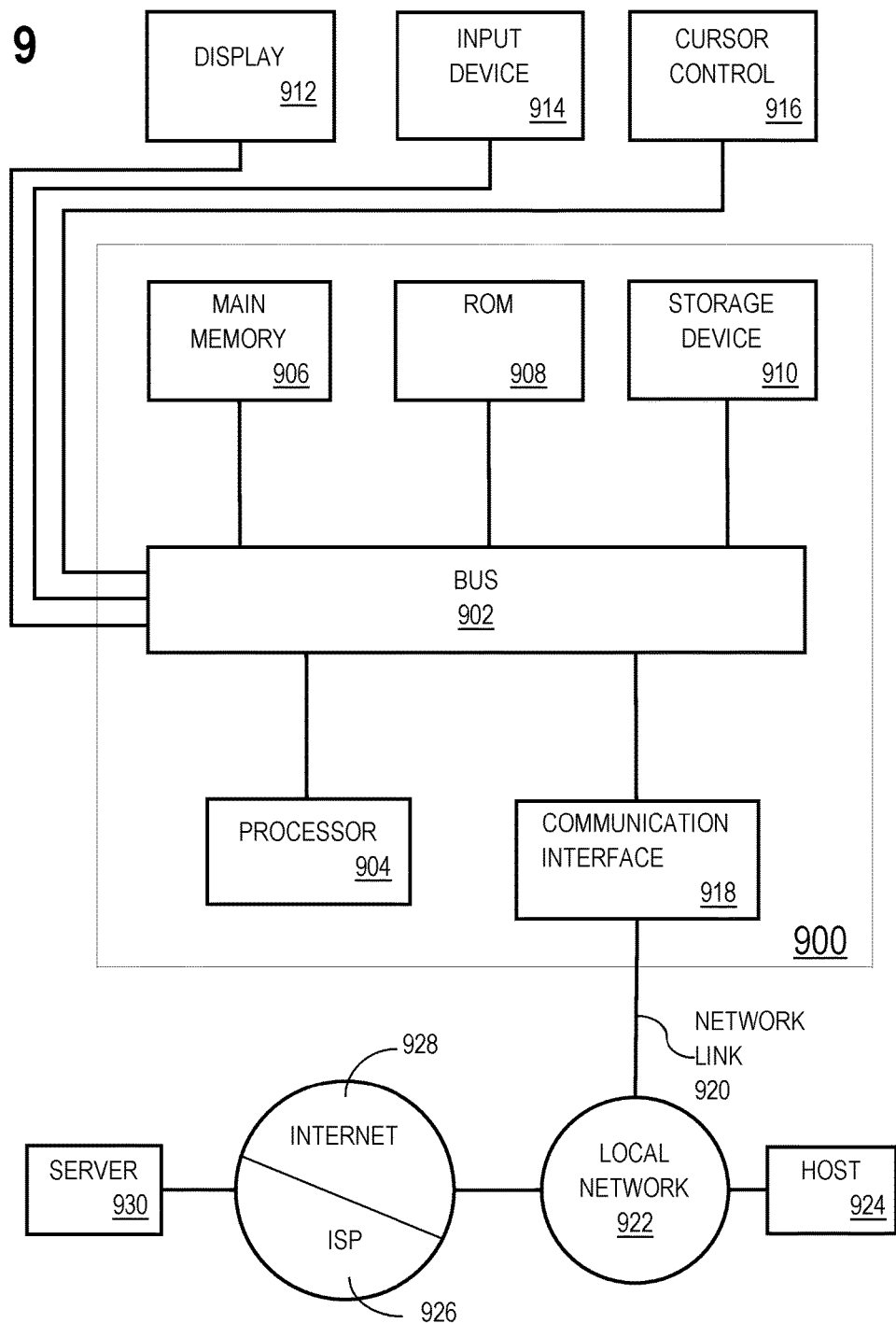

EXPOSING A SUBSET OF HOSTS ON AN OVERLAY NETWORK TO COMPONENTS EXTERNAL TO THE OVERLAY NETWORK WITHOUT EXPOSING ANOTHER SUBSET OF HOSTS ON THE OVERLAY NETWORK

RELATED APPLICATIONS; INCORPORATION BY REFERENCE

This application is related to U.S. Non-Provisional patent application Ser. No. 15/227,516, filed Aug. 3, 2016, which is hereby incorporated by reference.

TECHNICAL FIELD

The present disclosure relates to computer networks. In particular, the present disclosure relates to exposing a subset of hosts on an overlay network to components external to the overlay network without exposing another subset of hosts on the overlay network.

BACKGROUND

A substrate computer network (also referred to herein as a "substrate network" or "underlay network") includes various digital devices. Each digital device performs one or more functions, such as but not limited to routing data, filtering data, inspecting data, processing data, and/or storing data. A digital device may be a function-specific hardware device or a generic machine configured to perform a particular function. Examples of function-specific hardware devices include a hardware router, a hardware firewall, and a hardware network address translator (NAT). A generic machine, such as a server, may execute various virtual machines and/or software applications performing respective functions. Digital devices within a substrate network are connected by one or more physical links. Examples of physical links include a coaxial cable, an unshielded twisted cable, a copper cable, and an optical fiber.

An overlay computer network (also referred to herein as an "overlay network" or "ON") is a network abstraction implemented on a substrate network. One or more overlay networks may be implemented on a same substrate network. Hosts in an overlay network are connected by virtual or logical communication paths, each of which corresponds to one or more physical links of the substrate network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 shows a block diagram that illustrates a computer system in accordance with one or more embodiments.

DETAILED DESCRIPTION

Figure 1A:
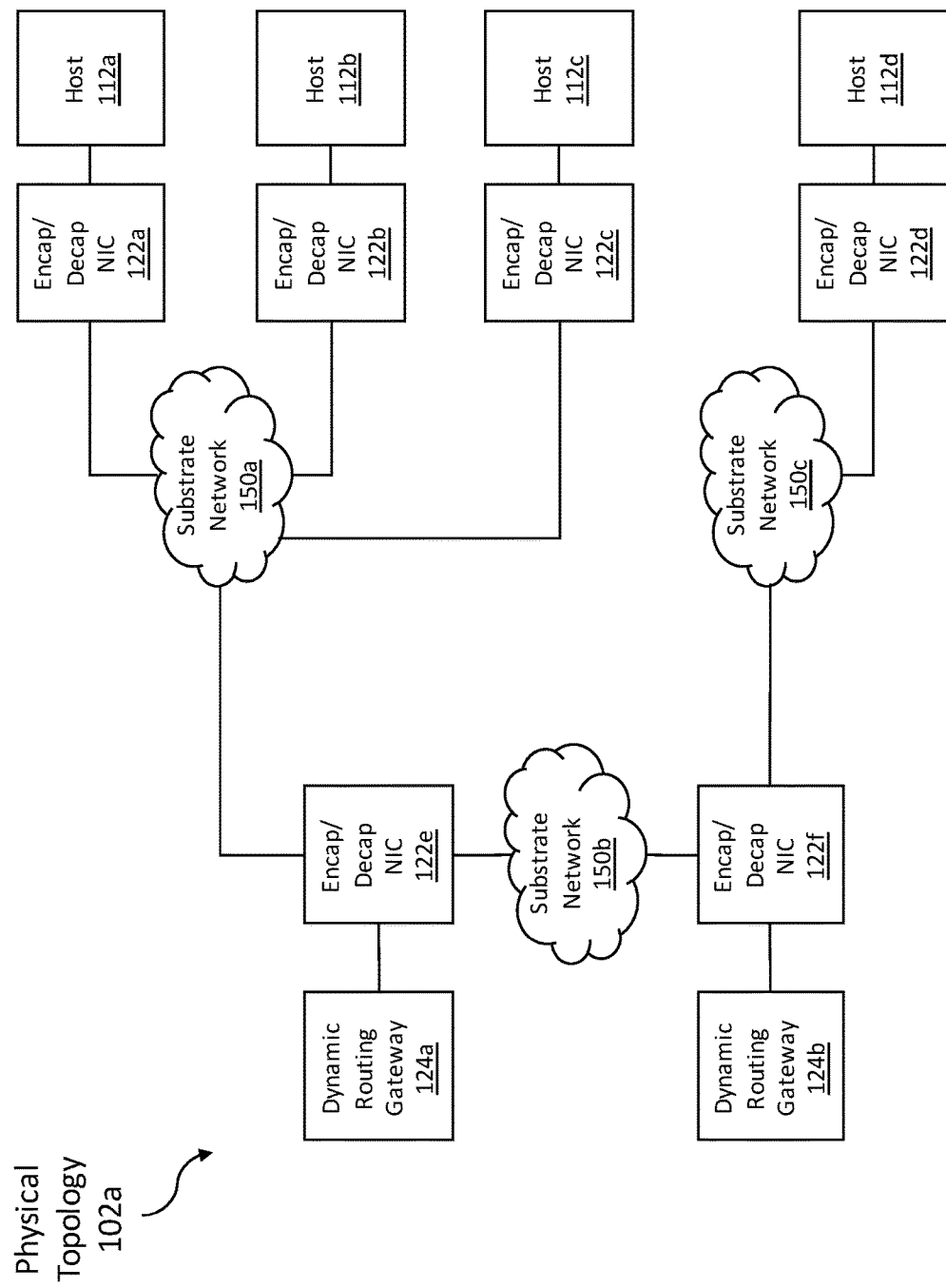
FIGS. 1A-1B illustrate examples of physical topologies, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview
2. Physical Topologies and Virtual Topologies
3. Control System Architecture
4. Exposing a Subset of Hosts on an Overlay Network
5. Transmitting a Message Based on Routing Information on a Subset of Hosts on an Overlay Network
6. Example Embodiment
7. Implementing a Function-Specific Hardware Device in an Off-Premise multi-Tenant Computing Network
8. Cloud Computing Networks
9. Miscellaneous; Extensions
10. Hardware Overview

1. General Overview

One or more embodiments include a component of an overlay network (referred to as "internal component") exposing a subset of hosts, on the overlay network, to components external to the overlay network without exposing another subset of hosts on the overlay network. A component of an overlay network (referred to as "internal component") exposes a subset of hosts on the overlay network. The internal component identifies the subset of hosts on the overlay network to be exposed to the external components. The internal component identifies another subset of hosts to be hidden from the external components. The internal component exposes the subset of hosts to-be-exposed by distributing a mapping between (a) the hosts to-be-exposed and (b) the substrate addresses associated with the hosts. The external components may use the mapping to determine the substrate addresses associated with the hosts. Furthermore, the external components may transmit data, destined for the hosts on the overlay network, to the substrate addresses associated with the hosts via a substrate network. Another subset of hosts on the same overlay network are hidden from the components external to the overlay network. Specifically, the internal component does not distribute the mapping between (a) the hosts to-be-hidden and (b) the substrate addresses of the hosts to-be-hidden to the external components. In at least one embodiment, the mapping between (a) at least three hosts to-be-exposed and (b) the substrate addresses corresponding respectively to the three hosts to-be-exposed are distributed to components external to the overlay network; furthermore, the mapping between (c) at least one host to-be-hidden and (d) the substrate address corresponding to the at least one host to-be-hidden is not distributed to the components external to the overlay network.

One or more embodiments include a component external to an overlay network (referred to as "external component") exposing a subset of hosts, on the overlay network, to additional components external to the overlay network without exposing another subset of hosts on the overlay network. The external component identifies the subset of hosts on the overlay network to be exposed to the additional external components. The external component identifies another subset of hosts on the overlay network to be hidden from the additional external components. The external component exposes the subset of hosts to-be-exposed by distributing a mapping between (a) the hosts to-be-exposed and (b) a substrate address associated with the external component to the additional external components. The additional external components may transmit data, destined for the hosts on the overlay network, to the substrate address associated with the external component via a substrate network. The external component does not expose the hosts to-be-hidden to the additional external components. Specifically, the external component does not distribute the mapping between (a) the hosts to-be-hidden and (b) any substrate addresses associated with the hosts to-be-hidden to the additional external components.

One or more embodiments described in this Specification and/or recited in the claims may not be included in this General Overview section.

2. Physical Topologies and Virtual Topologies

FIG. 1A illustrates an example of a physical topology 102a, in accordance with one or more embodiments. In one or more embodiments, physical topology 102a may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

As illustrated, hosts 112a-112c are connected to encapsulation-decapsulation network interface cards (referred to herein as "encap-decap NIC") 122a-122c, respectively. Encap-decap NICs 122a-122c are connected to substrate network 150a.

As illustrated, host 112d is connected to encap-decap NIC 122d. Encap-decap NIC 122d is connected to substrate network 150c.

As illustrated, dynamic routing gateway (referred to herein as "DRG") 124a is connected to encap-decap NIC 122e. Encap-decap NIC 122e is connected to substrate network 150a and substrate network 150b.

As illustrated, DRG 124b is connected to encap-decap NIC 122f. Encap-decap NIC 122f is connected to substrate network 150c and substrate network 150b.

In one or more embodiments, substrate network 150a-150c refers to a computer network including various digital devices connected by physical links. Each digital device performs one or more functions, such as but not limited to routing data, filtering data, inspecting data, processing data, and/or storing data. A digital device may be a function-specific hardware device or a generic machine configured to perform a particular function. Examples of function-specific hardware devices include a hardware router, a hardware firewall, and a hardware network address translator (NAT). A generic machine, such as a server, may execute various virtual machines and/or software applications performing respective functions. Digital devices within a substrate network are connected by one or more physical links. Examples of physical links include a coaxial cable, an unshielded twisted cable, a copper cable, and an optical fiber.

The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a hardware router, a hardware switch, a hardware firewall, a hardware filter, a hardware network address translator (NAT), a hardware load balancer, a hardware intrusion detection system, a function-specific hardware device, a mainframe, a television, a content receiver, a set-top box, a printer, a mobile handset, a smartphone, and a personal digital assistant (PDA).

A substrate network may be used to implement a cloud computing network. A cloud computing network includes a pool of resources that are shared amongst multiple client devices. Examples of resources include a processor, server, a data storage device, a virtual machine (VM), a platform, and/or a software application performing a respective function. Client devices may independently request computing services, such as server time and network storage space, as needed. The resources may be dynamically assigned to the requests and/or client devices on an on-demand basis.

Additionally, a cloud computing network may be shared amongst multiple tenants. A tenant (also referred to herein as a "customer") is an entity that is associated with one or more client devices for accessing the cloud computing network. Each tenant may be independent from other tenants. For example, a business or operation of one tenant may be separate from a business or operation of another tenant. A tenant may require that the data of the tenant be maintained separately from the data of other tenants. Additionally or alternatively, a tenant may provide a particular level of access to other tenants for accessing the data of the tenant. Further, each tenant may require different levels of computing services to be provided by the cloud computing network. Tenant requirements may include, for example, processing speed, amount of data storage, level of security, and/or level of resiliency. A multi-tenant cloud computing network is also an off-premise computer network, as the computer network is implemented at a location that is away from the premises of the tenants served by the computer network.

Additional embodiments and/or examples relating to cloud computing networks are also described below in Section 7, titled "Cloud Computing Networks."

A substrate network may implement one or more overlay networks. An overlay network is a network abstraction implemented on a substrate network. Hosts in an overlay network are connected by virtual or logical communication paths, each of which corresponds to one or more physical links of the substrate network.

Hosts within a same overlay network may transmit communication to each other. Additionally or alternatively, hosts of different overlay networks may transmit communication to each other. An overlay network corresponding to a host that transmits communication to a host of another overlay network functions as a "source overlay network." An overlay network corresponding to a host that receives communication from a host of another overlay network functions as a "destination overlay network." An overlay network may simultaneously function as both a source overlay network and a destination overlay network.

Substrate network 150a, substrate network 150b, and/or substrate network 150c may be a same substrate network that implements multiple overlay networks. Alternatively, substrate network 150a, substrate network 150b, and/or substrate network 150c may be different substrate networks, each implementing a different overlay network.

In one or more embodiments, host 112a-112d refers to hardware and/or software configured to provide computing resources and/or services to consumers of a computer network. A host may be, for example, a function-specific hardware device, a generic machine, a virtual machine, a virtual component, a server, a data storage device, a platform, and/or a software application.

Each host is associated with a substrate address (also referred to herein as an "underlay address") of the substrate network. A substrate address associated with a particular host (also referred to herein as a "substrate address of a particular host") is the substrate address of the machine executing the particular host. Since one machine may execute multiple hosts, multiple hosts may share a same substrate address. The substrate address is used when routing a data packet through the substrate network. Examples of substrate addresses include an Internet Protocol (IP) address and a Media Access Control (MAC) address.

Each host is associated with an overlay address of an overlay network. Each host of an overlay network is associated with an overlay address that is unique to that overlay network. However, hosts of different overlay networks may have overlapping overlay addresses. Examples of overlay addresses include an IP address and a MAC address.

In one or more embodiments, DRG 124a-124b refers to hardware and/or software configured to route communications between hosts of one or more overlay networks.

A DRG determines how to route a data packet based on a routing table stored at a data repository. The routing table may be maintained locally by the DRG. Alternatively, the routing table may be maintained by a control plane associated with the DRG, which is further described below with reference to FIG. 2.

The term "data repository" generally refers to any type of storage unit and/or device (e.g., a file system, database, collection of tables, or any other storage mechanism) for storing data. A data repository may include multiple different storage units and/or devices. The multiple different storage units and/or devices may or may not be of the same type or located at the same physical site. A data repository of a DRG may be implemented or may execute on the same computing system as the DRG. Alternatively or additionally, the data repository may be implemented or executed on a computing system separate from the DRG. The data repository may be communicatively coupled to the DRG via a direct connection or via a network.

The routing table identifies a communication path for reaching an overlay network, a subnetwork of an overlay network, and/or a host in an overlay network. The routing table includes a separate entry for each destination. The destination may be specified using a network prefix, which identifies a network and/or subnetwork. Alternatively, the destination may be specified using a full IP address, which identifies a host. A communication path for the destination is identified by (a) an egress port associated with the DRG, and/or (b) an address of a next hop, for transmitting a data packet toward the destination. The routing table may further include a cost associated with the communication path. The cost may be expressed as a number of hops needed to reach the destination, a duration of time needed to reach the destination, and/or any other metric used for measuring cost.

In one or more embodiments, encap-decap NIC 122a-122f refers to hardware and/or software configured to encapsulate and/or decapsulate a data packet.

Encapsulation is the process of enclosing a data packet using an additional packet header. An initial packet header of the data packet includes information used for routing the data packet through a network (e.g., an overlay network) based on a protocol. The additional packet header added to the data packet includes information used for routing the data packet through a different network, such as a substrate network. Additionally or alternatively, the additional data packet includes information used for routing the data packet based on a different protocol. Decapsulation is the process of removing the additional packet header to obtain the data packet with the initial packet header. The additional packet header is also referred to herein as an "outer packet header." The initial packet header is also referred to herein as an "inner packet header."

Encapsulation and decapsulation are used in the transmission of data packets between hosts of one or more overlay networks. As an example, host 112a may generate a data packet for transmission to host 112b. The data packet may include an initial packet header. The initial packet header may specify the destination of the data packet using an overlay address of host 112b. Encap-decap NIC 122a, which is associated with host 112a, may map the overlay address of host 112b to a substrate address associated with host 112b. Encap-decap NIC 122a may generate an additional packet header that specifies the destination of the data packet using the substrate address associated with host 112b. Encap-decap NIC 122a may encapsulate the data packet by adding the additional packet header. Encap-decap NIC 122a may transmit the data packet through substrate network 150a using the substrate address of host 112b. Machines of substrate network 150a route the data packet based on the additional packet header, without accessing the initial packet header.

Continuing the example, encap-decap NIC 122b, which is associated with host 112b, may receive the data packet through substrate network 150a based on the substrate address of host 112b. The data packet may include the additional packet header. Encap-decap NIC 122b may decapsulate the data packet by removing the additional packet header to obtain the data packet with the initial packet header. Encap-decap NIC 122b may determine that the initial packet header specifies the overlay address of host 112b as the destination of the data packet. Based on the overlay address of host 112*b*, encap-decap NIC 122*b* may transmit the data packet to host 112*b*.

Each host or DRG of an overlay network is associated with an encap-decap NIC 122. As illustrated, host 112*a* is associated with encap-decap NIC 122*a*. Host 112*b* is associated with encap-decap NIC 122*b*. Host 112*c* is associated with encap-decap NIC 122*c*. Host 112*d* is associated with encap-decap NIC 122*d*. DRG 124*a* is associated with encap-decap NIC 122*e*. DRG 124*b* is associated with encap-decap NIC 122*f*. A host and the associated encap-decap NIC may be implemented on a same machine or different machines of a substrate network. A DRG and the associated encap-decap NIC may be implemented on a same machine or different machines of a substrate network.

Encap-decap NIC determines the address to be included in the additional data packet, generated during encapsulation, based on a set of encapsulation-decapsulation mappings stored at a data repository. The set of encapsulation-decapsulation mappings may be maintained locally by the encap-decap NIC. Additionally or alternatively, the set of encapsulation-decapsulation mappings may be maintained by a control plane associated with the encap-decap NIC, which is further described below with reference to FIG. 2.

A data repository of encap-decap NIC may be implemented or may execute on the same computing system as encap-decap NIC. Alternatively or additionally, the data repository may be implemented or executed on a computing system separate from encap-decap NIC. The data repository may be communicatively coupled to encap-decap NIC via a direct connection or via a network.

The set of encapsulation-decapsulation mappings includes a mapping between (a) an overlay address of a host and (b) a substrate address that may be used to transmit communication via a substrate network toward the overlay address. As an example, the substrate address that may be used to transmit communication via the substrate network toward the overlay address may be a substrate address of a machine executing the host. As another example, the substrate address that may be used to transmit communication via the substrate network toward the overlay address may be a substrate address of a machine executing a DRG. The DRG may be configured to route communications towards the overlay address.

Figure 1B:
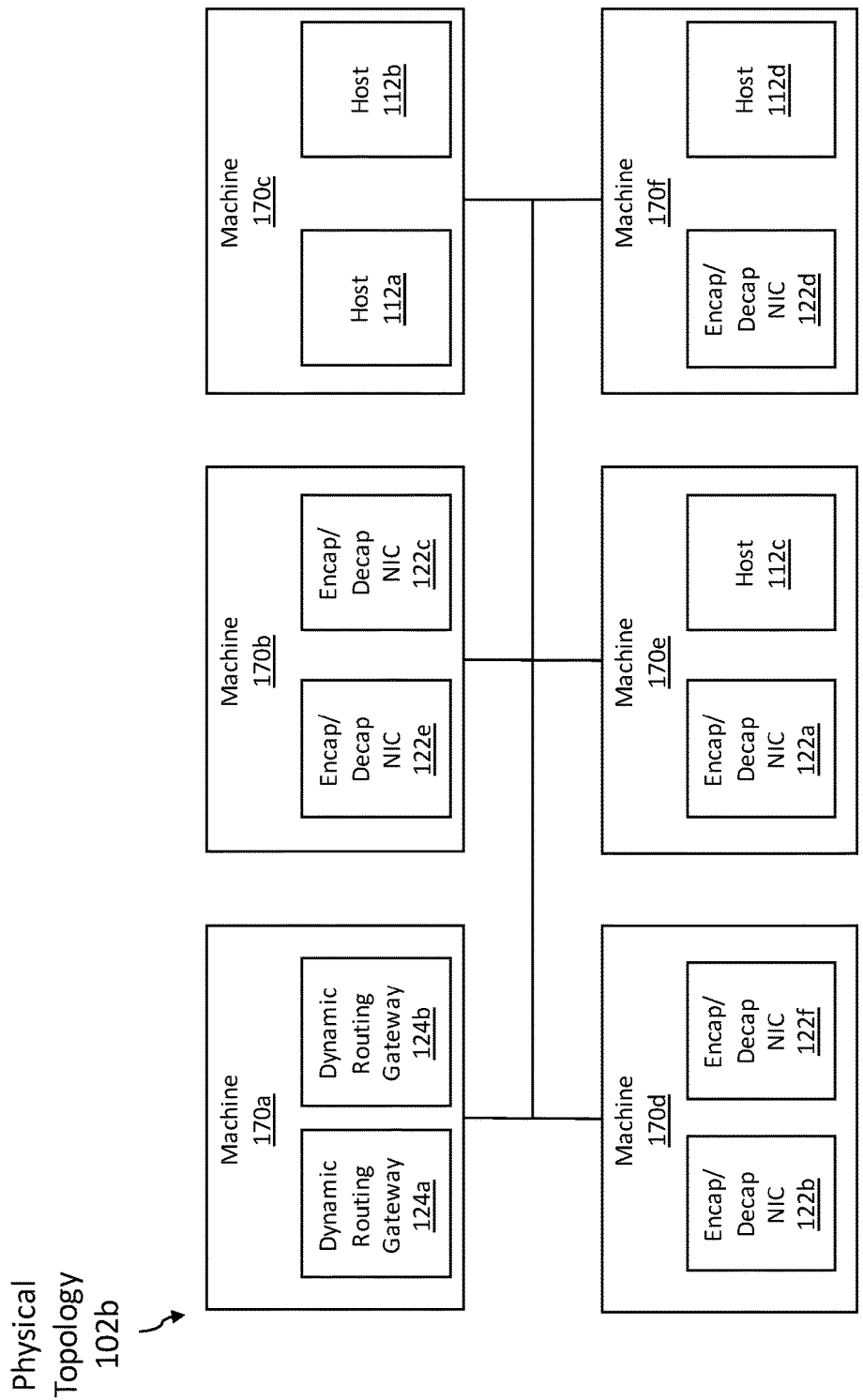

FIG. 1B illustrates a physical topology 102*b*, which is another view of physical topology 102*a* illustrated in FIG. 1A. Components labeled with a same number in FIGS. 1A-1D refer to a same component.

As illustrated in this example, a substrate network includes machines 170*a-f*, which may be directly or indirectly connected. Hosts 112*a-d*, encap-decap NICs 122*a-f*, and DRGs 124*a*-124*b* are implemented on the same substrate network. Machine 170*a* executes DRG 124*a* and DRG 124*b*. Machine 170*b* executes encap-decap NIC 122*e* and encap-decap NIC 122*c*. Machine 170*c* executes host 112*a* and host 112*b*. Machine 170*d* executes encap-decap NIC 122*b* and encap-decap NIC 122*f*. Machine 170*e* executes encap-decap NIC 122*a* and host 112*c*. Machine 170*f* executes encap-decap NIC 122*d* and host 112*d*. Machines 170*a-f* may execute additional and/or alternative components that are associated with a same overlay network or different overlay networks. Hosts, illustrated on a machine as being executed by the machine, may instead be executed by another machine communicatively coupled with the illustrated machine.

Machine 170*a*-170*f* (referred to herein as "machine 170") is a digital device. As described above, each digital device performs one or more functions, such as but not limited to routing data, filtering data, inspecting data, processing data, and/or storing data.

Each machine 170 is associated with a substrate address. Each component executed by a same machine 170 is associated with a same substrate address. Each component of an overlay network is associated with a unique overlay address. As an example, DRG 124*a* and DRG 124*b* may be associated with a same substrate address, that is, the substrate address of machine 170*a*. However, DRG 124*a* and DRG 124*b* may be associated with different overlay addresses.

Figure 1C:
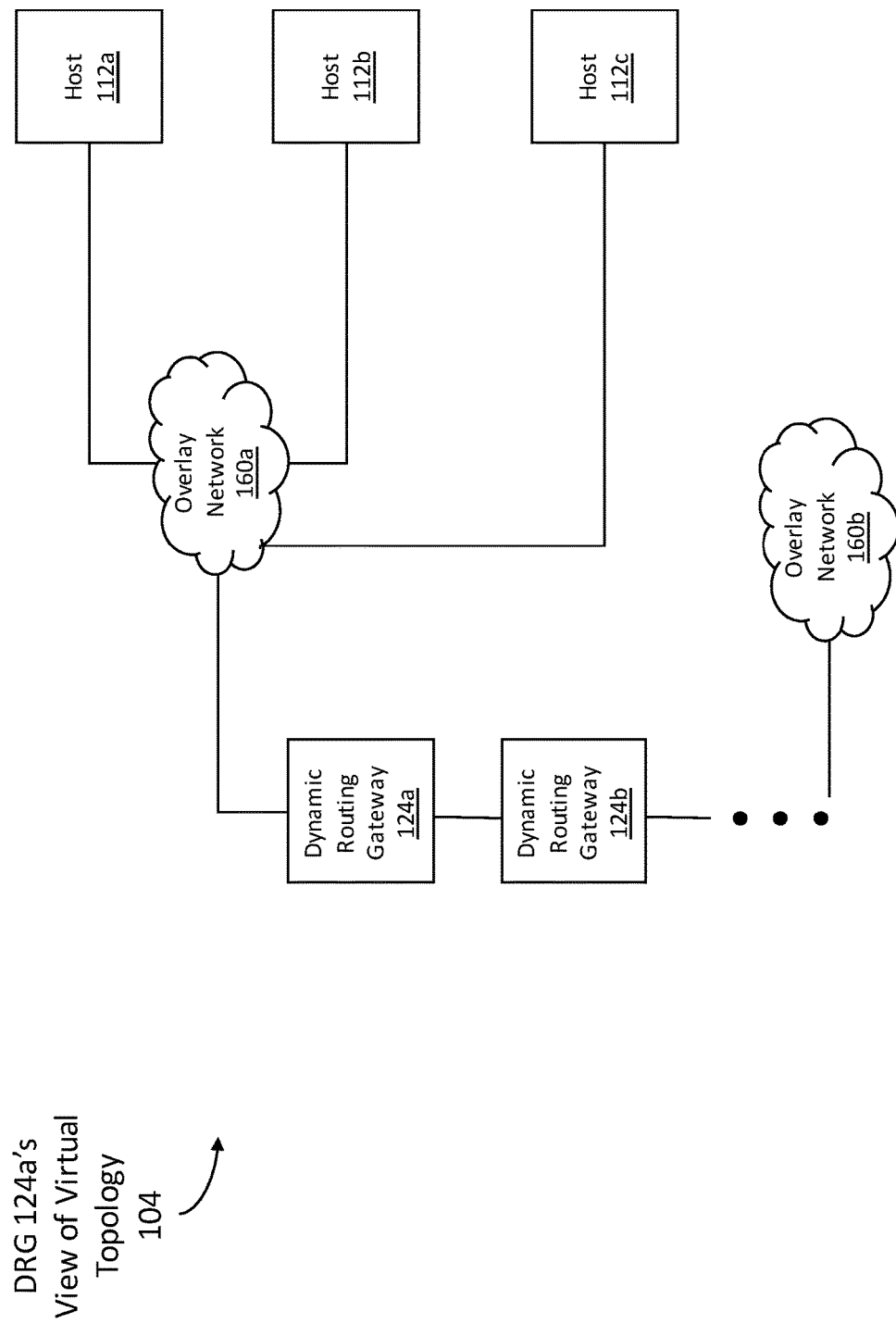
FIG. 1C-1D illustrates examples of virtual topologies, in accordance with one or more embodiments.
Figure 1D:
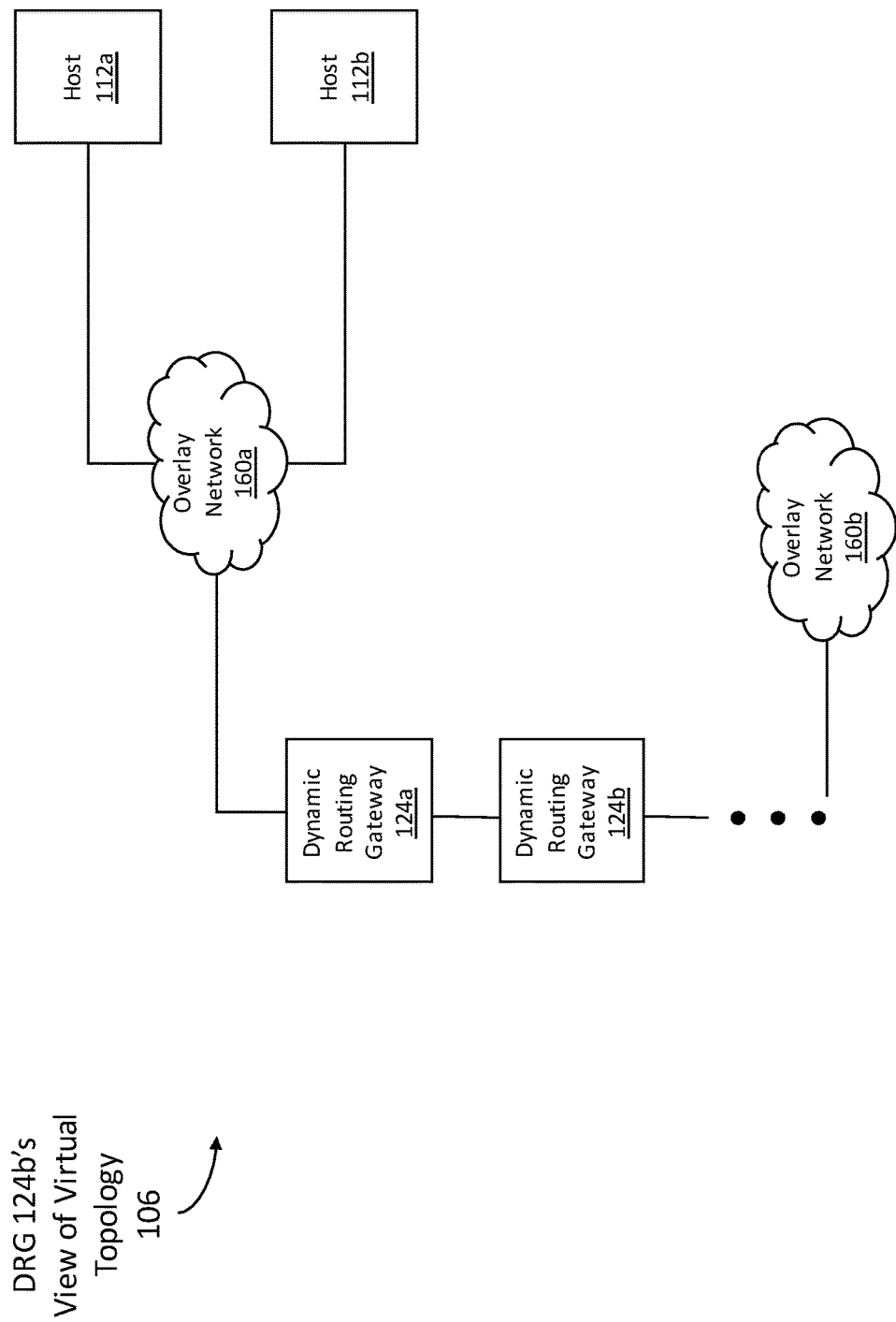

FIG. 1C-1D illustrates examples of virtual topologies, implemented on physical topology 102*a* illustrated in FIG. 1A, in accordance with one or more embodiments. Components labeled with a same number in FIGS. 1A-1D refer to a same component.

FIG. 1C illustrates a virtual topology 104 from the perspective of DRG 124*a*. DRG 124*a* and hosts 112*a*-112*c* are connected to overlay network (referred to herein as "ON") 160*a*. Further, DRG 124*a* is connected to DRG 124*b*. DRG 124*b* may be connected to ON 160*b*, which may include host 112*d*. As described above, DRG 124*a* uses encap-decap NIC 122*e* to encapsulate data packets for transmission within overlay networks implemented over the substrate network.

In an example, the routing table associated with DRG 124*a* may identify a communication path for reaching host 112*a*, a communication path for reaching host 112*b*, and a communication path for reaching host 112*c*. Further, a set of encapsulation-decapsulation mappings associated with encap-decap NIC 122*e* may identify a mapping for each of host 112*a*, host 112*b*, and host 112*c*. The set of encapsulation-decapsulation mappings include: (a) a mapping between an overlay address and a substrate address of host 112*a*, (b) a mapping between an overlay address and a substrate address of host 112*b*, and (c) a mapping between an overlay address and a substrate address of host 112*c*.

Since the routing table and the set of encapsulation-decapsulation mappings include information for hosts 112*a*-112*c*, DRG 124*a* may transmit data packets to any of hosts 112*a-c*. From DRG 124*a*'s perspective, ON 160*a* is connected to hosts 112*a-c*.

FIG. 1D illustrates a virtual topology 106 from the perspective of DRG 124*b*. DRG 124*a* and hosts 112*a-b* are connected to ON 160*a*. Further, DRG 124*a* is connected to DRG 124*b*. DRG 124*b* may be connected to ON 160*b*, which may include host 112*d*. As described above, DRG 124*b* uses encap-decap NIC 122*f* to encapsulate data packets for transmission within overlay networks implemented over the substrate network.

In an example, the routing table associated with DRG 124*b* may identify a communication path for reaching host 112*a*, and a communication path for reaching host 112*b*. The routing information might not identify a communication path for reaching host 112*c*. Further, a set of encapsulation-decapsulation mappings associated with encap-decap NIC 122*f* may identify a mapping for each of host 112*a* and host 112*b*. The set of encapsulation-decapsulation mappings include: (a) a mapping between an overlay address and a substrate address of host 112*a*, and (b) a mapping between an overlay address and a substrate address of host 112*b*. The set of encapsulation-decapsulation mappings might not include a mapping between an overlay address and a substrate address of host 112*c*.

Since the routing table and the set of encapsulation-decapsulation mappings include information for hosts 112*a*-112*b* only, DRG 124*b* may transmit data packets to hosts 112*a*-112*b* only. If DRG 124*b* receives a data packet addressed to host 112c, DRG 124b would not be able to identify a communication path for transmitting the data packet toward host 112c based on the routing table. Further, encap-decap NIC 122f would not be able to identify a substrate address for transmitting the data packet through the substrate network that implements the overlay network of host 112c based on the set of encapsulation-decapsulation mappings. From DRG 124b's perspective, ON 160a is connected to hosts 112a-112b only. ON 160a is not connected to host 112c.

As illustrated in FIGS. 1C and 1D, components external to an overlay network may have different views of the overlay network. One component may see a particular subset of hosts in the overlay network. Another component may see a different subset of hosts in the overlay network.

3. Control System Architecture

Figure 2:
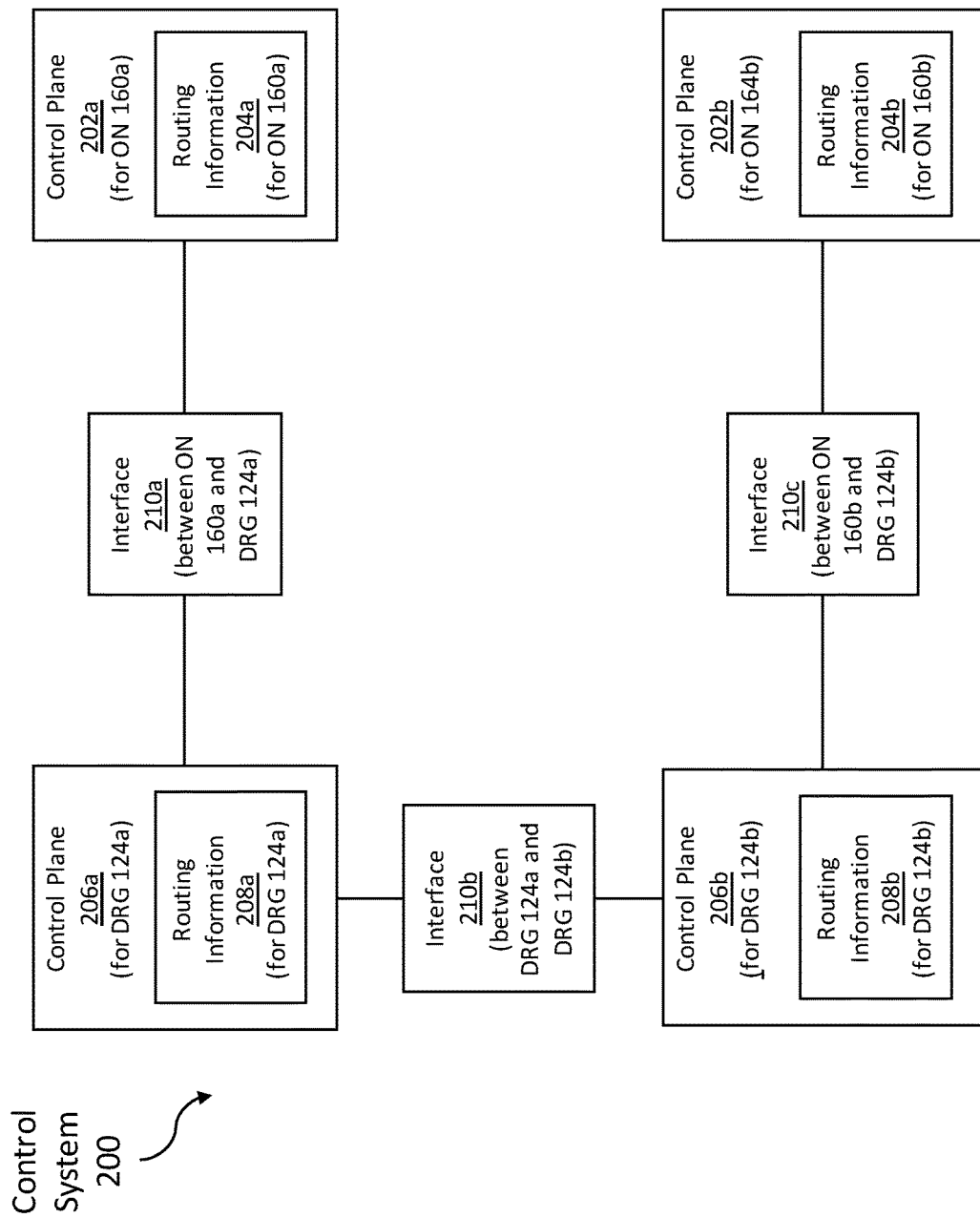
FIG. 2 illustrates an example of a control system, in accordance one or more embodiments.

FIG. 2 illustrates an example of a control system 200, for the overlay networks implemented on physical topology 102a illustrated in FIG. 1A, in accordance one or more embodiments. Components labeled with a same number in FIGS. 1A-1D and FIG. 2 refer to a same component. As illustrated in FIG. 2, control system 200 includes control plane 202a for ON 160a, control plane 202b for ON 160b, control plane 206a for DRG 124a, and control plane 206b for DRG 124b. Control plane 202a and control plane 206a are associated with interface 210a. Control plane 206a and control plane 206b are associated with interface 210b. Control plane 206b and control plane 202b are associated with interface 210c. As described above, in an example, ON 160a is connected to at least hosts 112a-c. ON 160b is connected to at least host 112d.

In one or more embodiments, control system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, control plane 202a refers to hardware and/or software configured to control and/or manage ON 160a. Control plane 202a is referred to herein as being "associated" with ON 160a. Control plane 202a may be implemented on a same component as one or more of encap-decap NICs 122a-c of ON 160a. Alternatively, control plane 202a may be implemented on a component that is different from any of the encap-decap NICs of ON 160a. Similarly, control plane 202b refers to hardware and/or software configured to control and/or manage ON 160b. Control plane 202b is referred to herein as being "associated" with ON 160b. Control plane 202b may be implemented on a same component as encap-decap NIC 122d of ON 160b. Alternatively, control plane 202b may be implemented on a component that is different from any of the encap-decap NICs of ON 160b.

Control plane 202a includes routing information 204a for ON 160a. Routing information 204a includes information for hosts in ON 160a. Hosts in ON 160a include, for example, hosts 112a-c. Routing information 204a identifies mappings between (a) an overlay address of each host in ON 160a and (b) a substrate address of a machine executing the host. The substrate address, of the machine executing the host, is a substrate address that may be used to transmit communication via a substrate network toward the overlay address of the host.

Additionally or alternatively, routing information 204a includes information for hosts external to ON 160a (such as hosts of a destination ON that is different than a source ON). Hosts external to ON 160a include, for example, host 112d of ON 160b. Host 112d of ON 160b may be a destination of a communication transmitted from host 112a-c of ON 160a. Routing information 204a identifies mappings between (a) an overlay address of a host external to ON 160a and (b) a substrate address of a machine executing the host. Additionally or alternatively, routing information 204a identifies mappings between (a) an overlay address of a host external to ON 160a and (b) a substrate address of a machine executing a gateway (such as, DRG 124a or DRG 124b). The gateway has access to a routing table and/or routing information that identifies a communication path for reaching the host. The substrate address of the machine executing the host or the substrate address of the machine executing the gateway is a substrate address that may be used to transmit communication via a substrate network toward the overlay address of the host.

Routing information 204a may include information for only a subset of hosts external to ON 160a, without including information for another subset of hosts external to ON 160a.

Routing information 204a is shared with each encap-decap NIC 122a-c of ON 160a. Routing information 204a may be transmitted to an encap-decap NIC. Additionally or alternatively, routing information 204a may be accessed and/or retrieved from control plane 202a by an encap-decap NIC.

Similarly, control plane 202b includes routing information 204b for ON 160b. Routing information 204b includes information for hosts in ON 160b (such as host 112d). Additionally or alternatively, routing information 204b includes information for hosts external to ON 160b. Routing information 204b may include information for only a subset of hosts external to ON 160b (such as, hosts 112a-b), without including information for another subset of hosts external to ON 160b (such as, host 112c). Routing information 204b is shared with each encap-decap NIC 122d of ON 160b.

In one or more embodiments, control plane 206a for DRG 124a refers to hardware and/or software configured to control and/or manage DRG 124a. Control plane 206a may be implemented on a same component as DRG 124a. Alternatively, control plane 206a may be implemented on a component that is different from DRG 124a. Similarly, control plane 206b for DRG 124b refers to hardware and/or software configured to control and/or manage DRG 124b. Control plane 206b may be implemented on a same component as DRG 124b. Alternatively, control plane 206b may be implemented on a component that is different from DRG 124b.

Control plane 206a includes routing information 208a for DRG 124a. Routing information 208a includes information for hosts in overlay networks that are communicatively coupled to DRG 124a.

Routing information 208a identifies mappings between (a) an overlay address of each host and (b) a substrate address of a machine executing the host. Additionally or alternatively, routing information 208a identifies mappings between (a) an overlay address of each host and (b) a substrate address of a machine executing a gateway (such as, DRG 124b). The gateway has access to a routing table and/or routing information that identifies a communication path for reaching the host. The substrate address of the machine executing the host or the substrate address of the machine executing the gateway is a substrate address that may be used to transmit communication via a substrate network toward the overlay address of the host.

Further, routing information 208b identifies an egress port for transmitting a communication toward an overlay network and/or a host. The egress port, together with the mapping between (a) an overlay address of the host and (b) a substrate address that may be used to transmit communication via a substrate network toward the overlay address of the host, identifies a communication path for reaching the host.

Routing information 208a may include information for only a subset of hosts in overlay networks that are communicatively coupled to DRG 124a, without including information for another subset of hosts in overlay networks that are communicatively coupled to DRG 124a. Routing information 208a is shared with DRG 124a.

Similarly, control plane 206b for DRG 124b includes routing information 208b for DRG 124b. Routing information 208b includes information for hosts in overlay networks that are communicatively coupled to DRG 124b. Routing information 208b may include information for only a subset of hosts in overlay networks that are communicatively coupled to DRG 124b (such as, host 112a, host 112b, and host 112d), without including information for another subset of hosts in overlay networks that are communicatively coupled to DRG 124b (such as, host 112c). Routing information 208b is shared with DRG 124b.

In one or more embodiments, interface 210a implements a policy managing communications between ON 160a and DRG 124a. The policy controls the exchange of information between control plane 202a for ON 160a and control plane 206a for DRG 124a. The policy identifies a subset of routing information 204a for ON 160a that may be shared with control plane 206a. The policy identifies a subset of routing information 208a for DRG 124a that may be shared with control plane 202a.

Similarly, interface 210b implements a policy managing communications between DRG 124a and DRG 124b. Interface 210c implements a policy managing communications between ON 160b and DRG 124b.

In an embodiment, interface 210a, interface 210b, or interface 210c controls access to a host of a particular overlay network by another host of another overlay network. As an example, interface 210a may implement a policy that restricts control plane 206a for DRG 124a from accessing routing information for a particular host in ON 160a. Without the routing information for the particular host in ON 160a, DRG 124a would be unable to route communications toward the particular host. Hence, DRG 124a would not have access to the particular host. Other components communicatively coupled to DRG 124a (such as DRG 124b and host 112d in ON 124b) would also not have access to the particular host via DRG 124a.

4. Exposing a Subset of Hosts on an Overlay Network

A subset of hosts of an overlay network (ON) are exposed to a component external to the ON. The ON is referred to herein as a "destination ON" because the ON includes a host that may receive communication from a host of another ON. The other ON is referred to herein as a "source ON." A control plane for the destination ON (such as control plane 202a or control plane 202b, as illustrated in FIG. 2) may expose a subset of hosts of the destination ON. Additionally or alternatively, a control plane for a gateway (such as control plane 206a or control plane 206b, as illustrated in FIG. 2) may expose another subset of hosts of the destination ON.

Figure 3:
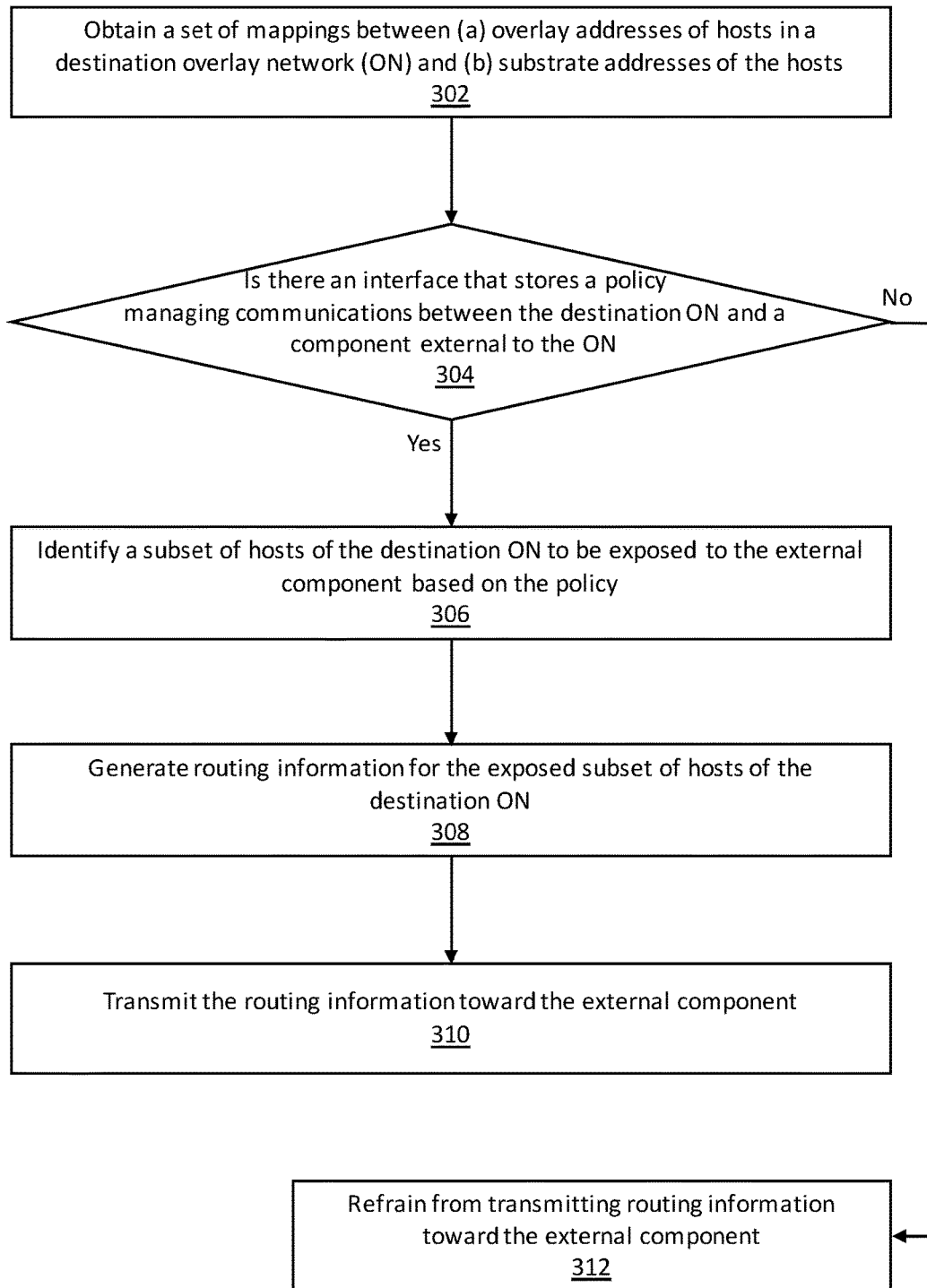
FIG. 3 illustrates an example set of operations for exposing a subset of hosts on an overlay network, by a component associated with the overlay network, in accordance with one or more embodiments.

A. Exposing a Subset of Hosts on an Overlay Network by a Component Associated with the Overlay Network FIG. 3 illustrates an example set of operations for exposing a subset of hosts on a destination overlay network, by a component associated with the destination overlay network, in accordance with one or more embodiments. The component associated with the destination overlay network may be, for example, a control plane for the destination overlay network (such as control plane 202a or control plane 202b, as illustrated in FIG. 2). While a control plane is referenced below, any component(s) associated with the destination overlay network may perform one or more of the operations described below. One or more operations illustrated in FIG. 3 may be modified, rearranged, or omitted all together. Accordingly, the particular sequence of operations illustrated in FIG. 3 should not be construed as limiting the scope of one or more embodiments.

One or more embodiments include obtaining a set of mappings between (a) overlay addresses of hosts in a destination overlay network (ON) and (b) substrate addresses of the hosts (Operation 302). A control plane for the destination ON monitors the hosts in the destination ON. If the control plane detects that a new host is being executed in the destination ON, then the control plane identifies (a) an overlay address of the new host and (b) a substrate address of the machine executing the new host. The control plane stores a mapping between the overlay address and the substrate address of the new host in a data repository. Conversely, if the control plane detects that a host in the destination ON is being terminated, then the control plane removes the mapping between the overlay address and the substrate address of the host from the data repository. Hence, the control plane maintains the set of mappings between overlay addresses and substrate addresses for all hosts in the destination ON. Each mapping is a mapping between the overlay address of a host and the substrate address of the host.

One or more embodiments include determining whether there is an interface that stores a policy managing communications between the destination ON and a component external to the destination ON (Operation 304). The component external to the destination ON is referred to herein as an "external component." The external component may be a gateway (such as DRG 124a or DRG 124b) or another ON (such as a source ON).

The control plane for the destination ON determines whether there is an interface between the destination ON and the external component. The interface between the destination ON and the external component, if any, stores the policy managing communications between the destination ON and the external component at a data repository. The interface and/or the policy are specified based on user input and/or by another application.

If there is no interface, then the control plane for the destination ON does not transmit routing information toward the external component (Operation 312). Routing information for the destination ON is not transmitted toward the external component. If there is an interface, then the control plane for the destination ON performs Operations 306-310.

One or more embodiments include identifying a subset of hosts of the destination ON to be exposed to the external component based on the policy (Operation 306).

The control plane for the destination ON obtains the policy from the interface. The control plane obtains the policy by receiving a copy of the policy from the interface. Additionally or alternatively, the control plane obtains the policy by accessing the policy from the data repository of the interface.

In an embodiment, the control plane obtains the policy in response to a change in the policy. The interface detects whether there has been a change to the policy. If there is a change to the policy, the interface transmits the updated policy to the control plane. Alternatively, the interface transmits a notification to the control plane, indicating that there has been a change to the policy. In response to the notification, the control plane accesses the updated policy from the interface.

In an embodiment, the control plane obtains the most recent version of the policy at regular time intervals. The control plane receives and/or accesses the policy from the interface at regular time intervals.

The policy stored at the interface includes identification of a subset of hosts of the destination ON that may be exposed to the external component. Additionally or alternatively, the policy includes identification of a subset of hosts of the destination ON that may not be exposed to the external component. The policy identifies the exposed subset of hosts and/or non-exposed subset of hosts by referencing the overlay addresses (or other unique identifiers) of the hosts. The control plane for the destination ON identifies the exposed subset of hosts specified by the policy.

One or more embodiments include generating routing information for the exposed subset of hosts of the destination ON (Operation 308). The control plane for the destination ON generates routing information for the exposed subset of hosts identified at Operation 306. The control plane does not generate routing information for the non-exposed subset of hosts.

The routing information includes a set of mappings for the exposed subset of hosts. Each mapping is a mapping between (a) an overlay address of an exposed host and (b) a substrate address of the exposed host. As described above, the substrate address of an exposed host is the substrate address of a machine executing the exposed host.

One or more embodiments include transmitting the routing information toward the external component (Operation 310). The control plane for the destination ON transmits the routing information to a control plane for the external component. Additionally or alternatively, the control plane for the destination ON transmits the routing information directly to the external component. The control plane transmits toward the external component the set of mappings for the exposed subset of hosts, without transmitting any mappings for the non-exposed subset of hosts.

Figure 4:
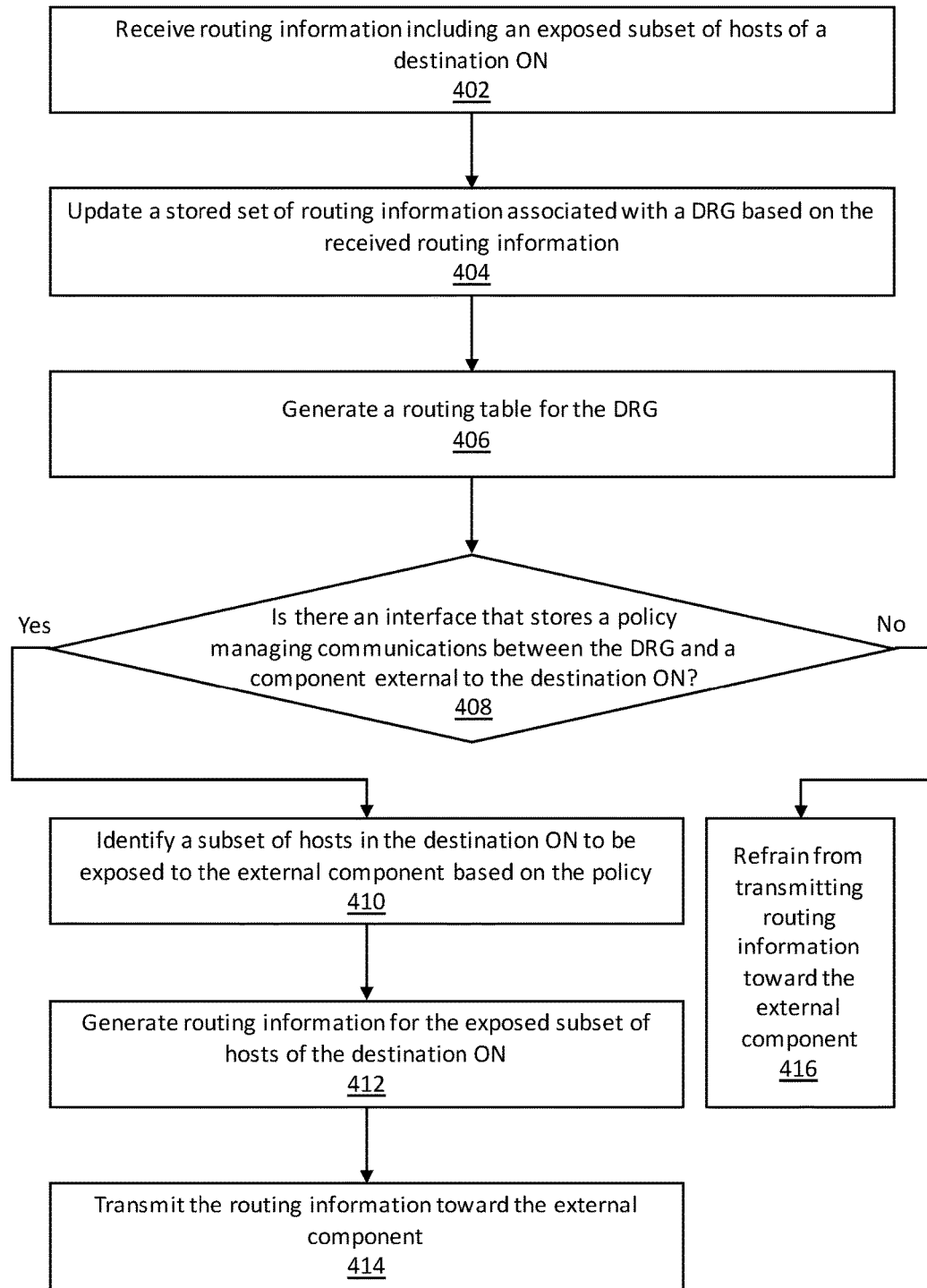
FIG. 4 illustrates an example set of operations for exposing a subset of hosts on an overlay network, by a component external to the overlay network, in accordance with one or more embodiments.

B. Exposing a Subset of Hosts of an Overlay Network by a Component External to the Overlay Network FIG. 4 illustrates an example set of operations for exposing a subset of hosts on a destination overlay network, by a component external to the destination overlay network, in accordance with one or more embodiments. A component external to the overlay network may be, for example, a control plane for a gateway (such as control plane 206a or control plane 206b, as illustrated in FIG. 2). While a control plane for a gateway is referenced below, any component(s) external to the destination overlay network may perform one or more of the operations described below. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include receiving routing information including an exposed subset of hosts of a destination ON (Operation 402).

In an embodiment, a control plane for a gateway receives the routing information from the control plane for the destination ON (such as control plane 202a or control plane 202b). The received routing information is associated with the exposed subset of hosts that were identified by the control plane for the destination ON (such as the exposed subset of hosts identified at Operation 306 of FIG. 3). The received routing information includes mappings between (a) overlay addresses of exposed hosts and (b) substrate addresses of exposed hosts. Additionally or alternatively, the received routing information identifies any changes to the hosts, of the destination ON, that are being exposed to the gateway. The received routing information includes mappings between (a) overlay addresses of the newly exposed hosts and (b) substrate addresses of the newly exposed hosts. The received routing information identifies hosts that had been exposed and are no longer exposed.

In an alternative embodiment, a control plane for a particular gateway (such as control plane 206b) receives the routing information from the control plane for an additional gateway (such as control plane 206a). The received routing information is associated with the exposed subset of hosts that were identified by the control plane for the additional gateway. The received routing information includes mappings between (a) overlay addresses of exposed hosts and (b) a substrate address associated with the additional gateway. Additionally or alternatively, the received routing information identifies any changes to the hosts, of the destination ON, that are being exposed to the particular gateway. The received routing information includes mappings between (a) overlay addresses of the newly exposed hosts and (b) a substrate address associated with the additional gateway. The received routing information identifies hosts that had been exposed and are no longer exposed One or more embodiments include updating a stored set of routing information associated with the gateway based on the received routing information (Operation 404). The control plane for the gateway maintains the routing information for the gateway (such as routing information 208a or routing information 208b) at a data repository. The routing information for the gateway includes information for hosts known to the gateway. Hosts known to the gateway may include hosts of the destination ON and/or hosts of other overlay networks.

The control plane for the gateway adds the routing information received at Operation 402 to the stored set of routing information for the gateway. The control plane adds the mappings for hosts, of the destination ON, that are being newly exposed. The control plane removes mappings for hosts, of the destination ON, that had been exposed and are no longer exposed.

Additionally, the control plane for the gateway identifies a particular port of the gateway that is communicatively coupled to the destination ON. The control plane specifies the particular port as an egress port for communication addressed to a host in the destination ON. The control plane stores information identifying the egress port in the stored set of routing information for the gateway.

One or more embodiments include generating a routing table for the gateway (Operation 406).

In an embodiment, the stored set of routing information for the gateway serves as a routing table for the gateway. The gateway accesses the routing information from a data repository of the control plane for the gateway.

In another embodiment, a routing table that is separate from the stored set of routing information is generated for the gateway. The routing table may be stored at a data repository that is local to or remote from the gateway. The control plane for the gateway and/or the gateway itself generates the routing table based on the stored set of routing information.

The routing table includes identification of an egress port, associated with the gateway, for transmitting communication toward the destination ON and/or a host in the destination ON. The egress port is the same egress port identified at Operation 404 and specified in the routing information.

Additionally or alternatively, the routing table includes identification of an overlay address and/or substrate address of a next hop for transmitting communication toward the destination ON and/or a host in the destination ON.

One or more embodiments include determining whether there is an interface that stores a policy managing communications between the gateway and a component external to the destination ON (Operation 408). The component external to the destination ON is referred to herein as an "external component." The external component may be another gateway or another ON (such as a source ON).

The control plane for the gateway determines whether there is an interface between the gateway and the external component. Example operations for determining whether there is an interface are described above with reference to Operation 304 of FIG. 3.

If there is no interface, then the control plane for the gateway does not transmit routing information toward the external component (Operation 416). Routing information for the destination ON and any other overlay networks known to the gateway are not transmitted toward the external component. If there is an interface, then the control plane for the gateway performs Operations 410-414.

One or more embodiments include identifying a subset of hosts in the destination ON to be exposed to the external component based on the policy (Operation 410).

The control plane for the gateway obtains the policy from the interface. Example operations for obtaining the policy from the interface are described above with reference to Operation 306 of FIG. 3.

The policy stored at the interface controls access to hosts known to the gateway, including hosts of the destination ON and/or hosts of other overlay networks. The policy stored at the interface includes identification of a subset of hosts, of the destination ON, that may be exposed to the external component. Example operations for identifying a subset of hosts to be exposed based on a policy are described with reference to Operation 306 of FIG. 3.

In an embodiment, the hosts exposed at Operation 414 may be the same as or different than the hosts exposed at Operation 306. The hosts exposed at Operation 414 is determined based on the policy managing communications between the gateway and an external component. The hosts exposed at Operation 306 is determined based on the policy managing communications between the destination ON and another external component.

One or more embodiments include generating routing information for the exposed subset of hosts of the destination ON (Operation 412). The control plane for the gateway generates routing information for the exposed subset of hosts identified at Operation 410. The control plane does not generate routing information for the non-exposed subset of hosts.

The routing information includes overlay addresses of the exposed subset of hosts. Additionally, the routing information includes identification of an ingress port associated with the gateway. The ingress port is configured to receive communication from the external component. The routing information is a many-to-one mapping between (a) the overlay addresses of the exposed subset of hosts of the destination ON and (b) the substrate address of the ingress port.

One or more embodiments include transmitting the routing information toward the external component (Operation 414). The control plane for the gateway transmits the routing information to the control plane for the external component. Additionally or alternatively, the control plane for the gateway transmits the routing information directly to the external component. The control plane for the gateway transmits toward the external component the set of mappings for the exposed subset of hosts, without transmitting any mappings for the non-exposed subset of hosts.

Figure 5:
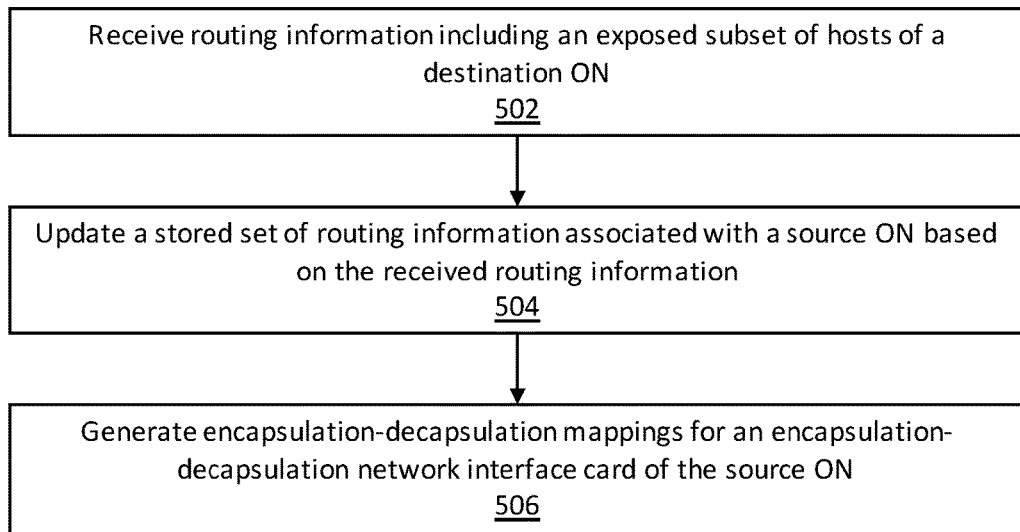
FIG. 5 illustrates an example set of operations for storing routing information for a destination overlay network, by a component associated with a source overlay network, in accordance with one or more embodiments.

C. Storing Routing Information, for a Destination Overlay Network, by a Component Associated with a Source Overlay Network FIG. 5 illustrates an example set of operations for storing routing information for a destination overlay network, by a component associated with a source overlay network, in accordance with one or more embodiments. A component associated with a source overlay network may be, for example, a control plane for the source overlay network (such as control plane 202a or control plane 202b, as illustrated in FIG. 2). While a control plane for a source overlay network is referenced below, any component(s) associated with the source overlay network may perform one or more of the operations described below. The operations described below relate to configuring a source ON that receives routing information for routing communication to a destination ON. One or more operations illustrated in FIG. 5 may be modified, rearranged, or omitted all together. Accordingly, the particular sequence of operations illustrated in FIG. 5 should not be construed as limiting the scope of one or more embodiments.

One or more embodiments include receiving routing information including an exposed subset of hosts of a destination ON (Operation 502).

In an embodiment, a control plane for a source ON receives the routing information from a control plane for a gateway (such as control plane 206a or control plane 206b). The received routing information is associated with the exposed subset of hosts identified by the control plane for the gateway (such as the exposed subset of hosts identified at Operation 410 of FIG. 4). The received routing information includes mappings between (a) overlay addresses of exposed hosts and (b) a substrate address of an ingress port, associated with the gateway, used for receiving communication from the source ON. Example operations for receiving routing information including an exposed subset of hosts are described above with reference to Operation 402 of FIG. 4.

In an alternative embodiment, a control plane for a source ON (such as control plane 202b) receives the routing information from a control plane for the destination ON (such as control plane 202a). The received routing information is associated with the exposed subset of hosts that were identified by the control plane for the destination ON (such as the exposed subset of hosts identified at Operation 306 of FIG. 3). The received routing information includes mappings between (a) overlay addresses of exposed hosts and (b) substrate addresses of exposed hosts.

One or more embodiments include updating a stored set of routing information associated with the source ON based on the received routing information (Operation 504). The control plane for the source ON maintains the routing information for the source ON (such as routing information 204a or routing information 204b) at a data repository. The routing information for the source ON includes information for hosts known to the source ON. Hosts known to the source ON include hosts in the source ON. Hosts known to the source ON may also include hosts of the destination ON and/or hosts of other overlay networks.

The control plane for the source ON adds the routing information received at Operation 502 to the stored set of routing information for the source ON. The control plane adds the mappings for hosts, of the destination ON, that are being newly exposed. The control plane removes mappings for hosts, of the destination ON, that had been exposed and are no longer exposed.

One or more embodiments include generating encapsulation-decapsulation mappings for an encapsulation-decapsulation network interface card of the source ON (Operation 506).

In an embodiment, the stored set of routing information for the source ON serves as a set of encapsulation-decapsulation mappings for one or more encap-decap NICs of the source ON. An encap-decap NIC of the source ON accesses routing information for the source ON from a data repository for the control plane for the source ON.

In another embodiment, a set of encapsulation-decapsulation mappings, separate from the stored set of routing information for the source ON, is generated for one or more encap-decap NICs of the source ON. A set of encapsulation-decapsulation mappings may be stored at a data repository that is local to or remote from one or more encap-decap NICs of the source ON. The control plane for the source ON generates the encapsulation-decapsulation mappings based on the stored set of routing information for the source ON. Additionally or alternatively, one or more encap-decap NICs of the source ON generates the encapsulation-decapsulation mappings based on the stored set of routing information for the source ON. The encapsulation-decapsulation mappings includes mappings between (a) an overlay address of each exposed host of the destination ON and (b) a substrate address that may be used to transmit communication via a substrate network toward the overlay address of the exposed host. The substrate address is identified by the stored set of routing information for the source ON.

Figure 6:
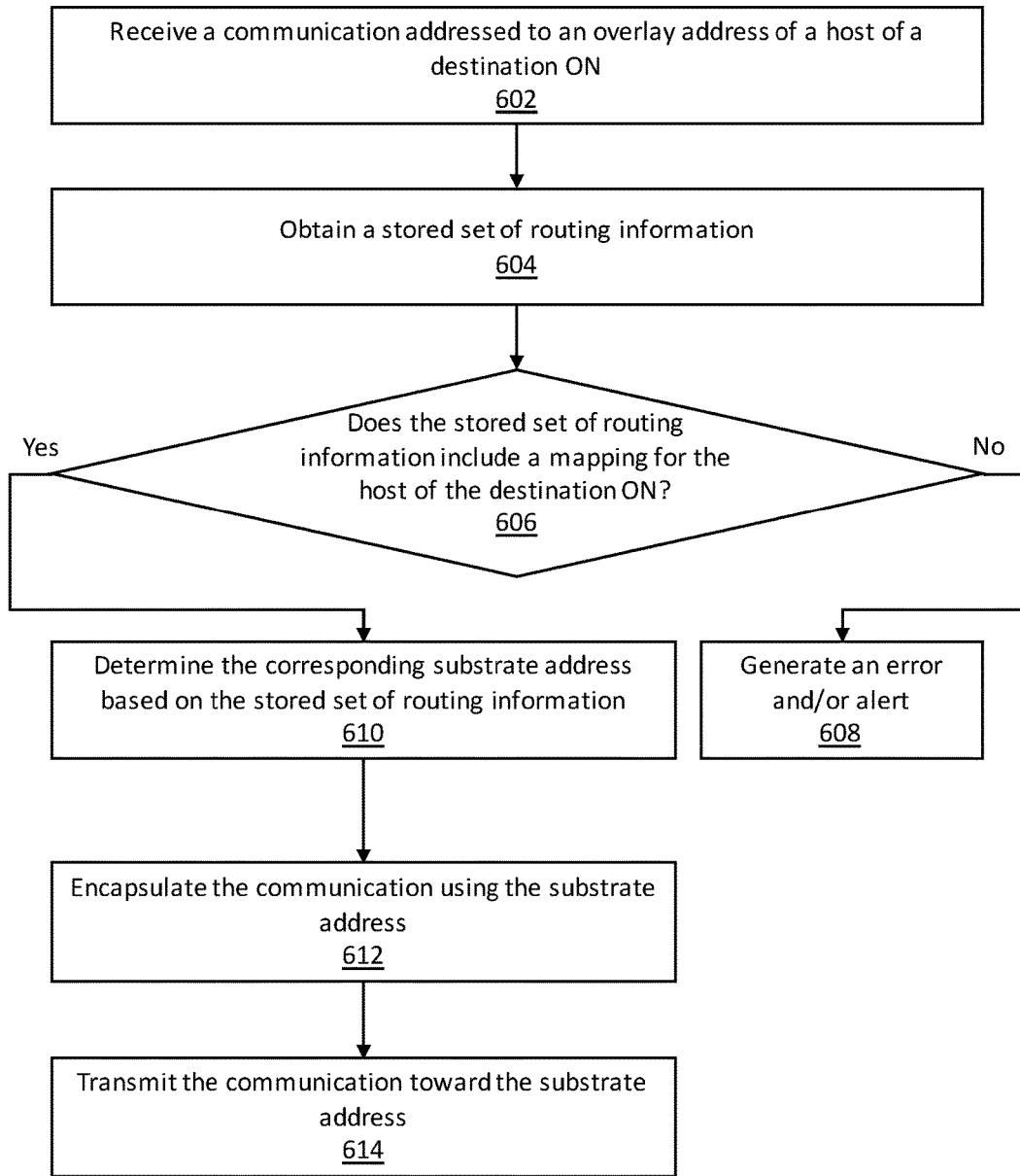
FIG. 6 illustrates an example set of operations for transmitting a message from a host of a source overlay network to a host of a destination overlay network, in accordance with one or more embodiments.

5. Transmitting a Message Based on Routing Information on a Subset of Hosts on an Overlay Network FIG. 6 illustrates an example set of operations for transmitting a message from a host of a source ON to a host of a destination ON, in accordance with one or more embodiments. The operations may be performed by an encap-decap NIC associated with a host (such as encap-decap NIC 122a, encap-decap NIC 122b, encap-decap NIC 122c, or encap-decap NIC 122d, as illustrated in FIG. 2). Alternatively, the operations may be performed by an encap-decap NIC associated with a gateway (such as encap-decap NIC 122e or encap-decap NIC 122f, as illustrated in FIG. 2). One or more operations illustrated in FIG. 6 may be modified, rearranged, or omitted all together. Accordingly, the particular sequence of operations illustrated in FIG. 6 should not be construed as limiting the scope of one or more embodiments.

One or more embodiments include receiving a communication addressed to an overlay address of a host of a destination ON (Operation 602). An encap-decap NIC, associated with a host or a gateway, receives the communication.

The communication may be encapsulated such that the communication includes an outer packet header and an inner packet header. The outer packet header may identify the substrate address of the encap-decap NIC as the destination of the communication. The inner packet header may identify an overlay address of the host of the destination ON as the destination of the communication.

The encap-decap NIC decapsulates the communication to remove the outer packet header. The encap-decap NIC obtains the communication including the inner packet header. The encap-decap NIC identifies the overlay address of the host of the destination ON based on the inner packet header.

One or more embodiments include obtaining a stored set of routing information (Operation 604).

In an embodiment, the encap-decap NIC, performing Operation 604, is associated with a host of a source ON. The encap-decap NIC obtains a stored set of routing information for the source ON (such as, routing information 204a or routing information 204b). The encap-decap NIC obtains the stored set of routing information from the control plane for the source ON (such as, control plane 202a or control plane 202b).

In another embodiment, the encap-decap NIC, performing Operation 604, is associated with a gateway. The encap-decap NIC obtains a stored set of routing information for the gateway (such as, routing information 208a or routing information 208b). The encap-decap NIC obtains the stored set of routing information from the control plane for the gateway (such as, control plane 206a or control plane 206b).

One or more embodiments include determining whether the stored set of routing information includes a mapping for the host of the destination ON (Operation 606). The encap-decap NIC searches through the entries of the stored set of routing information. If the stored set of routing information includes an entry for the overlay address of the host of the destination ON, then the stored set of routing information includes a mapping for the host of the destination ON.

If the stored set of information does not include a mapping for the host of the destination ON, then the encap-decap NIC generates an error and/or an alert (Operation 608). The encap-decap NIC is unable to identify a substrate address corresponding to the overlay address of the host of the destination ON. The encap-decap NIC is unable to encapsulate the communication to transmit the communication over the substrate network. The communication cannot be transmitted to the host of the destination ON.

If the stored set of information includes a mapping for the host of the destination ON, then the encap-decap NIC performs Operations 610-614.

One or more embodiments include determining the corresponding substrate address based on the stored set of routing information (Operation 610). The encap-decap NIC identifies the substrate address mapped to the overlay address of the host of the destination ON, as specified by the stored set of routing information. The substrate address, mapped to the overlay address of the host of the destination ON, may be a substrate address of the host of the destination ON. Alternatively, the substrate address, mapped to the overlay address of the host of the destination ON, may be a substrate address of an ingress port associated with a gateway. The ingress port is configured to receive communication from the encap-decap NIC. The gateway is a next hop for transmitting the communication toward the host of the destination ON.

One or more embodiments include encapsulating the communication using the substrate address (Operation 612). The encap-decap NIC generates an additional packet header for the communication. The additional packet header includes the substrate address identified at Operation 610 as a destination for the communication. The encap-decap NIC encapsulates the communication using the additional packet header.

One or more embodiments include transmitting the communication toward the substrate address (Operation 614). The encap-decap NIC transmits the communication, including the additional packet header. Based on the additional packet header, the communication is addressed to the substrate address identified at Operation 610. The communication is transmitted via a substrate network toward the substrate address identified at Operation 610.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 7:
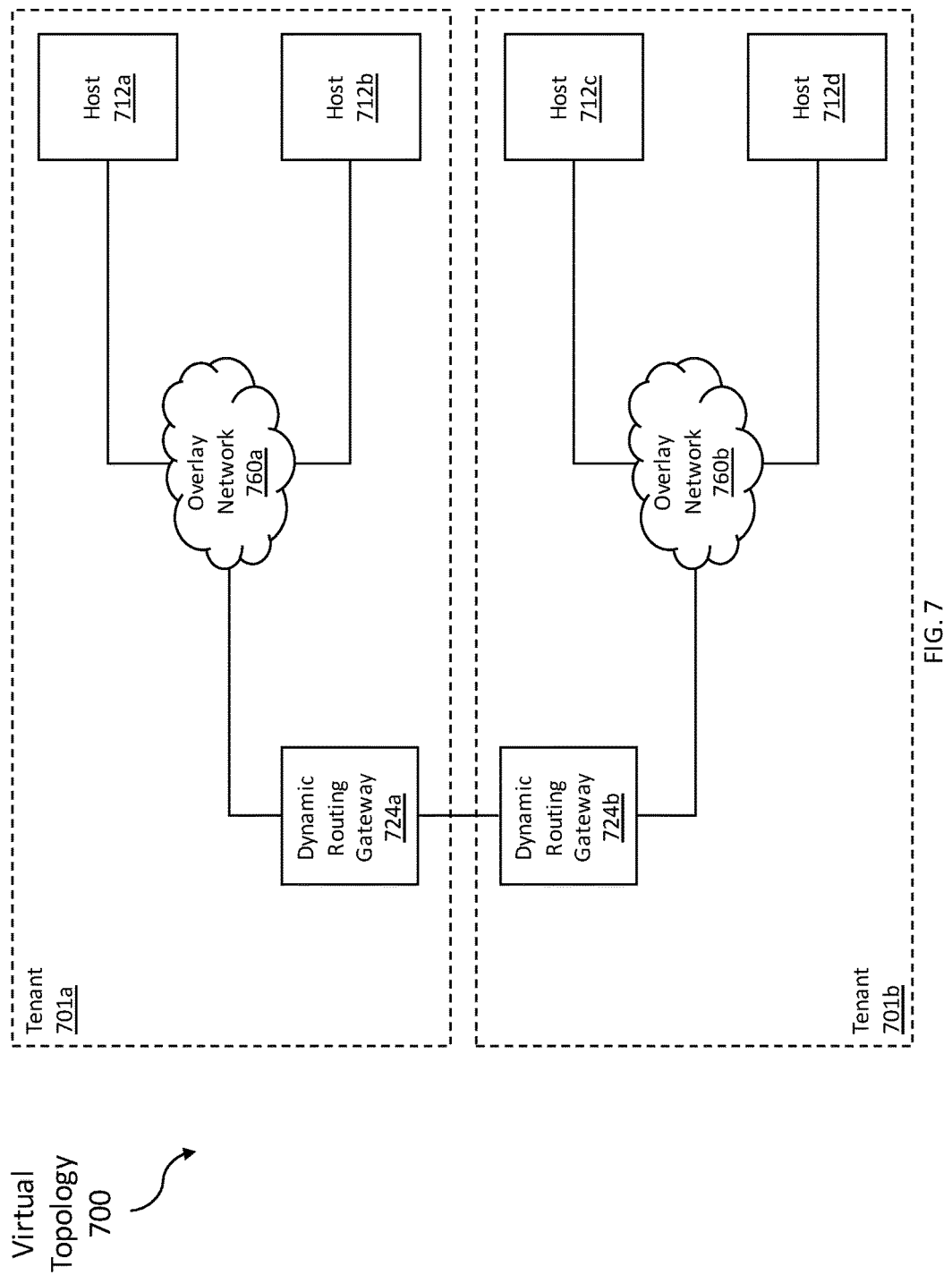
FIG. 7 illustrates an example of a virtual topology including overlay networks corresponding to different tenants, in accordance with one or more embodiments.

FIG. 7 illustrates an example of a virtual topology 700, including overlay networks corresponding to different tenants, in accordance with one or more embodiments.

As illustrated, DRG 724a and hosts 712a-712b are connected to ON 760a. DRG 724b and hosts 712c-712d are connected to ON 760b. Further, DRG 724a is connected to DRG 724b.

Tenant 701a is associated with ON 760a, hosts 712a-712b, and DRG 724a. Tenant 701a has administrative control over ON 760a, hosts 712a-712b, and DRG 724a. Additionally, tenant 701b is associated with ON 760b, hosts 712c-712d, and DRG 724b. Tenant 701b has administrative control over ON 760b, hosts 712c-712d, and DRG 724b.

Figure 8:
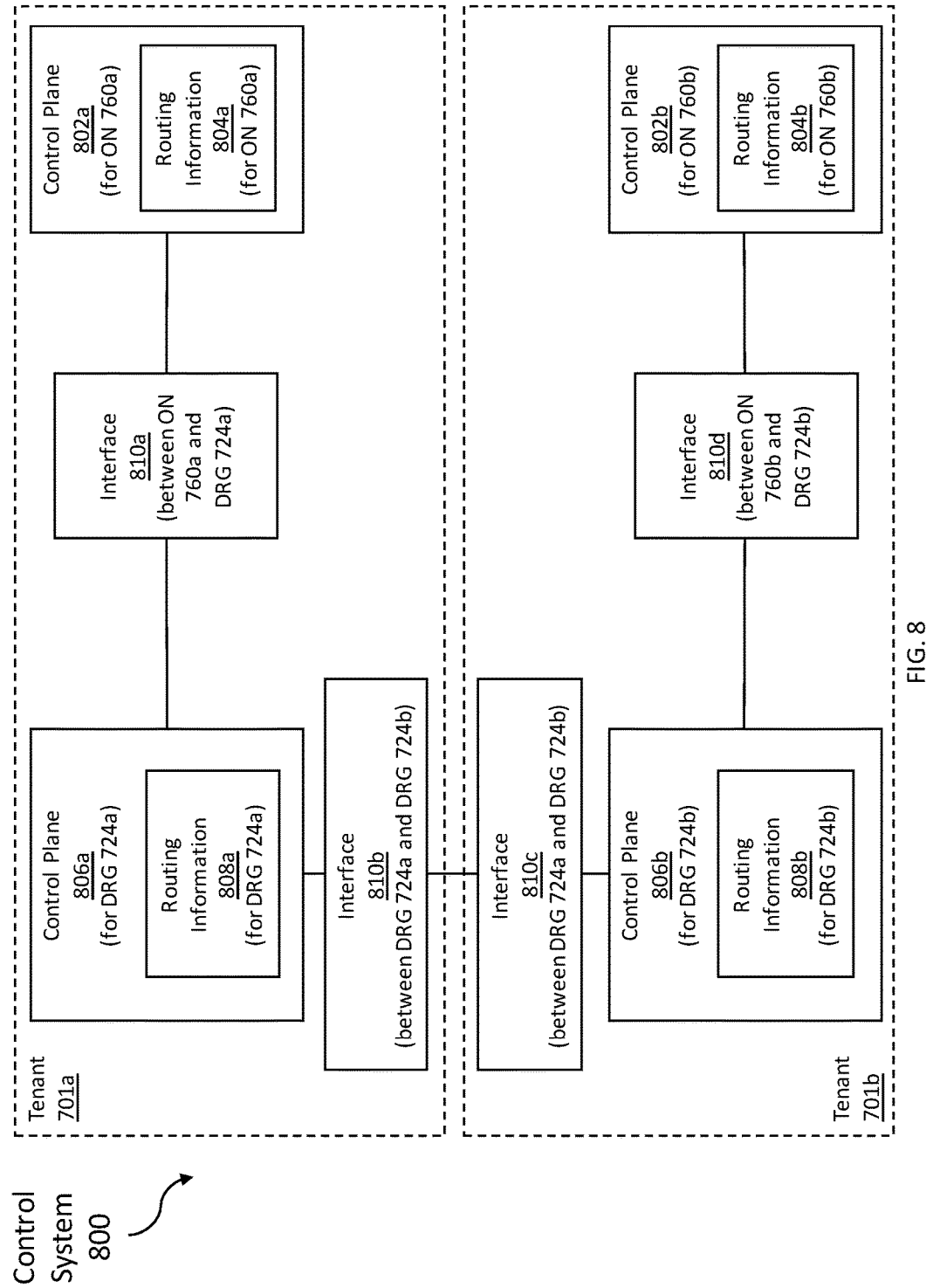
FIG. 8 illustrates an example of a control system for the virtual topology including overlay networks corresponding to different tenants, in accordance with one or more embodiments.

FIG. 8 illustrates an example of a control system for virtual topology 700, including overlay networks corresponding to different tenants, in accordance with one or more embodiments. As illustrated in FIG. 8, control system 800 includes control plane 802a for ON 760a, control plane 802b for ON 760b, control plane 806a for DRG 724a, and control plane 806b for DRG 724b. Control plane 802a and control plane 806a are associated with interface 810a. Control plane 806b and control plane are associated with interface 810d. Control plane 806a and control plane 806b are associated with two interfaces: interface 810b and interface 810c.

Tenant 701a is associated with control plane 802a, control plane 806a, interface 810a, and interface 810b. Additionally, tenant 701b is associated with control plane 802b, control plane 806b, interface 810c, and interface 810d.

In an example, control plane 802a for ON 760a obtains a set of mappings between overlay addresses and substrate addresses of hosts 712a-712b of ON 760a. Control plane 802a obtains, from interface 810a, a policy managing communications between ON 760a and DRG 724a. Control plane 802a identifies hosts of ON 760a to be exposed to DRG 824a based on the policy. The policy provides that hosts 712a-712b may be exposed to DRG 724a.

Control plane 802a generates routing information for the exposed hosts of ON 760a. The routing information includes mappings between an overlay address and a substrate address for each of hosts 712a-712b. Control plane 802a transmits the routing information toward DRG 724a.

Control plane 806a for DRG 724a receives the routing information from control plane 802a for ON 724a. Control plane 806a updates a stored set of routing information 808a for DRG 724a based on the received routing information.

Control plane 806a obtains, from interface 810b, a policy managing communications between DRG 724a and DRG 724b. The policy stored at interface 810b is managed by tenant 701a. A user of tenant 701a may modify the policy stored at interface 810b via a user interface and/or an application.

Control plane 806a further obtains, from interface 810c, a policy managing communications between DRG 724a and DRG 724b. The policy stored at interface 810c is managed by tenant 701b. A user of tenant 701b may modify the policy stored at interface 810c via a user interface and/or an application.

Control plane 806a identifies a subset of hosts of ON 760a to be exposed to DRG 724b based on the policies stored at interfaces 810b-810c. The policy stored at interface 810b provides that hosts 712a-712b may be exposed to DRG 724b. The policy stored at interface 810c provides that only host 712a may be exposed to DRG 724b. The policy stored at interface 810c provides that host 712b may not be exposed to DRG 724b.

Control plane 806a exposes a particular host to DRG 724b only if both policies provide permissions for DRG 724b to access the particular host. Based on the policies stored at interfaces 810b-c, the exposed subset of hosts of ON 760a includes only host 712a, and does not include host 712b.

Control plane 806a generates routing information for the exposed subset of hosts. The routing information includes a mapping between an overlay address of host 712a and a substrate address of an ingress port associated with DRG 724a. The ingress port is configured to receive communication from DRG 724b. The routing information does not include any mappings for host 712b. Control plane 806a transmits the routing information toward DRG 724b.

Control plane 806b for DRG 724b receives the routing information from control plane 806a for DRG 724a. Control plane 806b updates a stored set of routing information 808b for DRG 724b based on the received routing information. The stored set of routing information 808b includes a mapping for host 712a, but does not include a mapping for host 712b.

In the example described above, from the perspective of DRG 724b, ON 760a includes only host 712a and does not include host 712b. The subset of hosts of ON 760a accessible by DRG 724b are determined by both (a) the policy at interface 810b implemented by tenant 701a and (b) the policy at interface 810c implemented by tenant 701b.

7. Implementing a Function-Specific Hardware Device in an Off-Premise Multi-Tenant Computing Network In an embodiment, a tenant of a multi-tenant computing network may implement a function-specific hardware device in an overlay network associated with the tenant. The multi-tenant computing network may be remote from a premises of the tenant.

The function-specific hardware device may be, for example, a firewall, a filter, a load balancer, and/or an intrusion detection system. The function-specific hardware device may be provided by a service provider of a multi-tenant cloud computing network. Alternatively, the function-specific hardware device may be provided by a tenant of a multi-tenant cloud computing network. The tenant ships the hardware device to the service provider. The service provider adds the hardware device to the substrate network of the multi-tenant cloud computing network. In this example, an overlay network of the tenant is connected to the function-specific hardware device via one or more interfaces, such as interfaces 210a-c.

Referring to FIG. 1A, as an example, a particular tenant may require that a function-specific hardware device process any communication being transmitted from host 112d. Host 112d may be connected to an existing overlay network of the particular tenant.

Continuing the example, the function-specific hardware device may be added to a substrate network. The function-specific hardware device may be illustrated as host 112a.

Continuing the example, the particular tenant may specify policies to be implemented at interfaces 210a-c via a user interface. Based on the user input, interfaces 210a-c may provide permissions for host 112d to access host 112a. Control plane 202a for ON 160a shares routing information for host 112a to control plane 206a for DRG 124a. Control plane 206a shares routing information for host 112a to control plane 206b for DRG 124b. Control plane 206b shares routing information for host 112a to control plane 202b for ON 160b.

Based on interfaces 210a-c, host 112d may transmit communications to the function-specific hardware device. The function-specific hardware device may process communications transmitted from host 112d. Hence, the requirements of the particular tenant are satisfied. The particular tenant is able to implement a function-specific hardware device in the off-premise multi-tenant computing network.

8. Cloud Computing Networks

In one or more embodiments, a cloud computing network provides a pool of resources that are shared amongst multiple client devices. The pool of resources may be geographically centralized and/or distributed. Examples of resources include a processor, a server, a data storage device, a virtual machine (VM), a platform, and/or a software application. Client devices may independently request computing services, such as server time and network storage space, as needed. The resources may be dynamically assigned to the requests and/or client devices on an on-demand basis. The resources assigned to each particular client device may be scaled up or down based on the computing services requested by the particular client device. The resources assigned to each particular client device may also be scaled up or down based on the aggregated demand for computing services requested by all client devices.

In an embodiment, the resources of a cloud environment are accessible over a network, such as a private network or the Internet. One or more physical and/or virtual client devices demanding use of the resources may be local to or remote from the resources. The client devices may be any type of computing devices, such as computers or smartphones, executing any type of operating system. The client devices communicate requests to the resources using a communications protocol, such as Hypertext Transfer Protocol (HTTP). The requests are communicated to the resources through an interface, such as a client interface (such as a web browser), a program interface, or an application programming interface (API).

In an embodiment, a cloud service provider provides a cloud environment to one or more cloud users. Various service models may be implemented by the cloud environment, including but not limited to Software-as-a-Service (SaaS), Platform-as-a-Service (PaaS), and Infrastructure-as-a-Service (IaaS). In SaaS, a cloud service provider provides cloud users the capability to use the cloud service provider's applications, which are executing on the cloud resources. In PaaS, the cloud service provider provides cloud users the capability to deploy onto the cloud resources custom applications, which are created using programming languages, libraries, services, and tools supported by the cloud service provider. In IaaS, the cloud service provider provides cloud users the capability to provision processing, storage, networks, and other fundamental computing resources provided in the cloud environment. Any arbitrary applications, including an operating system, may be deployed on the cloud resources.

In an embodiment, various deployment models may be implemented by a cloud environment, including but not limited to a private cloud, a public cloud, and a hybrid cloud. In a private cloud, cloud resources are provisioned for exclusive use by a particular group of one or more entities (the term "entity" as used herein refers to a corporation, organization, person, or other entity). The cloud resources may be located on the premises of one or more entities in the particular group, and/or at one or more remote off-premise locations. In a public cloud, cloud resources are provisioned for multiple entities (also referred to herein as "tenants" or "customers"). Each tenant is associated with one or more client devices for accessing the cloud resources. Several tenants may use a same particular resource, such as a server, at different times and/or at the same time. The cloud resources may be located at one or more remote off-premise locations, away from the premises of the tenants. In a hybrid cloud, the cloud environment comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, in a multi-tenant cloud computing network, each tenant may be independent from other tenants. For example, a business or operation of one tenant may be separate from a business or operation of another tenant. Each tenant may require different levels of computing services to be provided by the cloud computing network. Tenant requirements may include, for example, processing speed, amount of data storage, level of security, and/or level of resiliency.

In an embodiment, in a multi-tenant cloud computing network, tenant isolation is implemented. Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In an embodiment, data sets corresponding to various tenants are stored as entries in a database. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In an embodiment, data sets corresponding to various tenants are stored in different databases or data structures. Each database or data structure is tagged with the tenant ID of the corresponding tenant. A request for access to a particular data set is tagged with the tenant ID of the tenant making the request. The tenant ID associated with the request is checked against the tenant ID associated with the database or data structure storing the data set to be accessed. If the tenant IDs are the same, then access to the database or data structure is permitted.

In an embodiment, a subscription list indicates which tenants have authorization to access which applications. For each application, a list of tenant IDs of each tenant having authorization to access the application is stored. A request for access to a particular application is tagged with the tenant ID of the tenant making the request. The tenant ID associated with the request is checked against the subscription list to determine whether the tenant is authorized to access the application. If the tenant ID associated with the request is included in the list of tenant IDs of tenants having authorization to access the application, then access to the application is permitted.

In an embodiment, data sets and virtual resources (e.g., virtual machines, application instances, and threads) corresponding to different tenants are isolated to tenant-specific overlay networks maintained by the cloud environment. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a first policy controlling access, to a set of hosts in a first overlay network implemented on a substrate network, by a second overlay network implemented on the substrate network;
       wherein the set of hosts of the first overlay network are respectively implemented by a set of digital devices of the substrate network;
       wherein the set of digital devices of the substrate network are connected by a set of physical links;
       wherein the set of hosts of the first overlay network are connected by virtual or logical communication paths, each corresponding to at least one of the set of physical links;
   determining, based on the first policy, that a first host and a second host, of the set of hosts of the first overlay network, are allowed to be exposed to the second overlay network;
   generating, by a first component associated with the first overlay network, a first set of routing information, wherein generating the first set of routing information comprises:
       responsive to determining that the first host is allowed to be exposed the second overlay network: including, into the first set of routing information, a first mapping between (a) a first overlay network address corresponding to the first host and (b) a first substrate address which may be used to transmit communication via the substrate network toward the first overlay network address;

responsive to determining that the second host is allowed to be exposed the second overlay network: including, into the first set of routing information, a second mapping between (a) a second overlay network address corresponding to the second host and (b) a second substrate address which may be used to transmit communication via the substrate network toward the second overlay network address;

transmitting, by the first component associated with the first overlay network, the first set of routing information toward a second component associated with the second overlay network;

identifying a second policy controlling access, to the set of hosts in the first overlay network, by a third overlay network implemented on the substrate network;

determining, based on the second policy, that (a) the first host, of the set of hosts of the first overlay network, is allowed to be exposed to the third overlay network, and (b) the second host, of the set of hosts of the first overlay network, is not allowed to be exposed to the third overlay network;

generating, by the second component associated with the second overlay network, a second set of routing information, wherein generating the second set of routing information comprises:

responsive to determining that the first host is allowed to be exposed the third overlay network: including, into the second set of routing information, a third mapping between (a) the first overlay network address corresponding to the first host and (b) a third substrate address which may be used to transmit communication via the substrate network toward the first overlay network address;

responsive to determining that the second host is not allowed to be exposed the third overlay network: refraining from including, into the second set of routing information, any mapping between (a) the second overlay network address corresponding to the second host and (b) any substrate address which may be used to transmit communication via the substrate network toward the second overlay network address;

transmitting, by the second component associated with the second overlay network, the second set of routing information toward a third component associated with the third overlay network.

2. The non-transitory computer readable medium of claim 1, wherein each of the first substrate address and the second substrate address corresponds to a same substrate address associated with a gateway on a communication path between the first overlay network and the second overlay network.

3. The non-transitory computer readable medium of claim 1, wherein the first substrate address corresponds to a machine executing the first host.

4. The non-transitory computer readable medium of claim 1, wherein the operations further comprise:

identifying a third policy controlling access, to the set of hosts in the first overlay network, by a fourth overlay network implemented on the substrate network, wherein the first policy and the third policy are different;

determining, based on the third policy, that (a) a third host, of the set of hosts of the first overlay network, is allowed to be exposed to the fourth overlay network and (b) a fourth host, of the set of hosts of the first overlay network, is not allowed to be exposed to the fourth overlay network;

generating, by the first component of the first overlay network, a third set of routing information, wherein generating the third set of routing information comprises:

responsive to determining that the third host is allowed to be exposed the fourth overlay network: including, into the third set of routing information, a fourth mapping between (a) a third overlay network address corresponding to the third host and (b) a fourth substrate address which may be used to transmit communication via the substrate network toward the third overlay network address;

responsive to determining that the fourth host is not allowed to be exposed the fourth overlay network: refraining from including, into the third set of routing information, any mapping between (a) a fourth overlay network address corresponding to the fourth host and (b) any substrate address which may be used to transmit communication via the substrate network toward the fourth overlay network address;

transmitting the third set of routing information toward a fourth component associated with the fourth overlay network.

5. The non-transitory computer readable medium of claim 1, wherein transmission of a communication from a third host in the second overlay network to the first host requires that the first host be included in the first set of routing information.

6. The non-transitory computer readable medium of claim 5, wherein transmission of a communication from a fourth host in the third overlay network to the first host requires that the first host be included in the second set of routing information.

7. The non-transitory computer readable medium of claim 1, wherein the first overlay network and the second overlay network are implemented by a set of machines that is remote from a premises of any tenant associated with the first overlay network or the second overlay network.

8. The non-transitory computer readable medium of claim 1, wherein the first overlay network comprises a hardware device configured to perform a particular function associated with data generated by a third host of the second overlay network.

9. The non-transitory computer readable medium of claim 8, wherein the hardware device comprises at least one of the following: a firewall, a filter, a load balancer, and an intrusion detection system.

10. The non-transitory computer readable medium of claim 1, wherein the second component associated with the second overlay network is a control plane associated with the second overlay network.

11. The non-transitory computer readable medium of claim 1, wherein the second component associated with the second overlay network is an encapsulation-decapsulation network interface card associated with the second overlay network.

12. The non-transitory computer readable medium of claim 1, wherein the second component associated with the second overlay network is a gateway associated with the second overlay network.

13. The non-transitory computer readable medium of claim 12, wherein:
the gateway is configured to identify a third policy controlling access to the second overlay network; and
exchange of messages between the first host of the first overlay network and a third host of the second overlay network requires that the first policy expose the first host and the second policy expose the third host.

14. The non-transitory computer readable medium of claim 1, wherein the operations further comprise:
adding, by the second component, the first set of routing information to a third set of routing information associated with the second component.

15. The non-transitory computer readable medium of claim 1, wherein:
of the first substrate address and the second substrate address corresponds to a same substrate address associated with a gateway on a communication path between the first overlay network and the second overlay network;
transmission of a communication from a third host in the second overlay network to the first host requires that the first host be included in the first set of routing information;
transmission of a communication from a fourth host in the third overlay network to the first host requires that the first host be included in the second set of routing information;
the first overlay network and the second overlay network are implemented by a set of machines that is remote from a premises of any tenant associated with the first overlay network or the second overlay network;
the operations further comprise:
adding, by the second component, the first set of routing information to a third set of routing information associated with the second component;
identifying a third policy controlling access, to the set of hosts in the first overlay network, by a fourth overlay network implemented on the substrate network, wherein the first policy and the third policy are different;
determining, based on the third policy, that (a) a third host, of the set of hosts of the first overlay network, is allowed to be exposed to the fourth overlay network and (b) a fourth host, of the set of hosts of the first overlay network, is not allowed to be exposed to the fourth overlay network;
generating, by the first component of the first overlay network, a third set of routing information, wherein generating the third set of routing information comprises:
responsive to determining that the third host is allowed to be exposed the fourth overlay network: including, into the third set of routing information, a fourth mapping between (a) a third overlay network address corresponding to the third host and (b) a fourth substrate address which may be used to transmit communication via the substrate network toward the third overlay network address;
responsive to determining that the fourth host is not allowed to be exposed the fourth overlay network: refraining from including, into the third set of routing information, any mapping between (a) a fourth overlay network address corresponding to the fourth host and (b) any substrate address which may be used to transmit communication via the substrate network toward the fourth overlay network address;
transmitting the third set of routing information toward a fourth component associated with the fourth overlay network.

16. The non-transitory computer readable medium of claim 1, wherein:
the operations further comprise:
determining, based on the first policy, that a third host, of the set of hosts of the first overlay network, is not allowed to be exposed to the second overlay network;
generating the first set of routing information further comprises:
responsive to determining that the third host is not allowed to be exposed the second overlay network: refraining from including, into the first set of routing information, any mapping between (a) a third overlay network address corresponding to the third host and (b) any substrate address which may be used to transmit communication via the substrate network toward the third overlay network address.

17. The non-transitory computer readable medium of claim 1, wherein the operations further comprise:
identifying a third policy controlling access, to the set of hosts in the first overlay network, by a fourth overlay network implemented on the substrate network;
determining, based on the third policy, that the first host and the second host are allowed to be exposed to the fourth overlay network;
generating, by the second component associated with the second overlay network, a third set of routing information, wherein generating the third set of routing information comprises:
responsive to determining that the first host is allowed to be exposed the fourth overlay network: including, into the third set of routing information, a fourth mapping between (a) the first overlay network address corresponding to the first host and (b) a fourth substrate address which may be used to transmit communication via the substrate network toward the first overlay network address;
responsive to determining that the second host is allowed to be exposed the fourth overlay network: including, into the third set of routing information, a fifth mapping between (a) the second overlay network address corresponding to the second host and (b) a fifth substrate address which may be used to transmit communication via the substrate network toward the second overlay network address;
transmitting, by the second component associated with the second overlay network, the third set of routing information toward a fourth component associated with the fourth overlay network.

18. The non-transitory computer readable medium of claim 1, wherein the operations further comprise:
identifying a third policy controlling access, to a second set of hosts in the second overlay network, by the first overlay network implemented on the substrate network;
determining, based on the third policy, that (a) a third host, of the second set of hosts in the second overlay network, is allowed to be exposed to the first overlay network, and (b) a fourth host, of the second set of hosts in the second overlay network, is not allowed to be exposed to the first overlay network;

generating, by the second component associated with the second overlay network, a third set of routing information, wherein generating the third set of routing information comprises:
  responsive to determining that the third host is allowed to be exposed the first overlay network: including, into the third set of routing information, a fourth mapping between (a) a third overlay network address corresponding to the third host and (b) a fourth substrate address which may be used to transmit communication via the substrate network toward the third overlay network address;
  responsive to determining that the fourth host is not allowed to be exposed the first overlay network: refraining from including, into the third set of routing information, any mapping between (a) a fourth overlay network address corresponding to the fourth host and (b) any substrate address which may be used to transmit communication via the substrate network toward the fourth overlay network address;
transmitting, by the second component associated with the second overlay network, the third set of routing information toward the first component associated with the first overlay network.

19. A system, comprising:
at least one hardware device including a processor;
the system configured to perform operations comprising:
  identifying a first policy controlling access, to a set of hosts in a first overlay network implemented on a substrate network, by a second overlay network implemented on the substrate network;
    wherein the set of hosts of the first overlay network are respectively implemented by a set of digital devices of the substrate network;
    wherein the set of digital devices of the substrate network are connected by a set of physical links;
    wherein the set of hosts of the first overlay network are connected by virtual or logical communication paths, each corresponding to at least one of the set of physical links;
  determining, based on the first policy, that a first host and a second host, of the set of hosts of the first overlay network, are allowed to be exposed to the second overlay network;
  generating, by a first component associated with the first overlay network, a first set of routing information, wherein generating the first set of routing information comprises:
    responsive to determining that the first host is allowed to be exposed the second overlay network: including, into the first set of routing information, a first mapping between (a) a first overlay network address corresponding to the first host and (b) a first substrate address which may be used to transmit communication via the substrate network toward the first overlay network address;
    responsive to determining that the second host is allowed to be exposed the second overlay network: including, into the first set of routing information, a second mapping between (a) a second overlay network address corresponding to the second host and (b) a second substrate address which may be used to transmit communication via the substrate network toward the second overlay network address;
  transmitting, by the first component associated with the first overlay network, the first set of routing information toward a second component associated with the second overlay network;
  identifying a second policy controlling access, to the set of hosts in the first overlay network, by a third overlay network implemented on the substrate network;
  determining, based on the second policy, that (a) the first host, of the set of hosts of the first overlay network, is allowed to be exposed to the third overlay network, and (b) the second host, of the set of hosts of the first overlay network, is not allowed to be exposed to the third overlay network;
  generating, by the second component associated with the second overlay network, a second set of routing information, wherein generating the second set of routing information comprises:
    responsive to determining that the first host is allowed to be exposed the third overlay network: including, into the second set of routing information, a third mapping between (a) the first overlay network address corresponding to the first host and (b) a third substrate address which may be used to transmit communication via the substrate network toward the first overlay network address;
    responsive to determining that the second host is not allowed to be exposed the third overlay network: refraining from including, into the second set of routing information, any mapping between (a) the second overlay network address corresponding to the second host and (b) any substrate address which may be used to transmit communication via the substrate network toward the second overlay network address;
  transmitting, by the second component associated with the second overlay network, the second set of routing information toward a third component associated with the third overlay network.

20. A method, comprising:
identifying a first policy controlling access, to a set of hosts in a first overlay network implemented on a substrate network, by a second overlay network implemented on the substrate network;
  wherein the set of hosts of the first overlay network are respectively implemented by a set of digital devices of the substrate network;
  wherein the set of digital devices of the substrate network are connected by a set of physical links;
  wherein the set of hosts of the first overlay network are connected by virtual or logical communication paths, each corresponding to at least one of the set of physical links;
determining, based on the first policy, that a first host and a second host, of the set of hosts of the first overlay network, are allowed to be exposed to the second overlay network;
generating, by a first component associated with the first overlay network, a first set of routing information, wherein generating the first set of routing information comprises:
  responsive to determining that the first host is allowed to be exposed the second overlay network: including, into the first set of routing information, a first mapping between (a) a first overlay network address corresponding to the first host and (b) a first substrate address which may be used to transmit communication via the substrate network toward the first overlay network address;

responsive to determining that the second host is allowed to be exposed the second overlay network: including, into the first set of routing information, a second mapping between (a) a second overlay network address corresponding to the second host and (b) a second substrate address which may be used to transmit communication via the substrate network toward the second overlay network address;

transmitting, by the first component associated with the first overlay network, the first set of routing information toward a second component associated with the second overlay network;

identifying a second policy controlling access, to the set of hosts in the first overlay network, by a third overlay network implemented on the substrate network;

determining, based on the second policy, that (a) the first host, of the set of hosts of the first overlay network, is allowed to be exposed to the third overlay network, and (b) the second host, of the set of hosts of the first overlay network, is not allowed to be exposed to the third overlay network;

generating, by the second component associated with the second overlay network, a second set of routing information, wherein generating the second set of routing information comprises:

responsive to determining that the first host is allowed to be exposed the third overlay network: including, into the second set of routing information, a third mapping between (a) the first overlay network address corresponding to the first host and (b) a third substrate address which may be used to transmit communication via the substrate network toward the first overlay network address;

responsive to determining that the second host is not allowed to be exposed the third overlay network: refraining from including, into the second set of routing information, any mapping between (a) the second overlay network address corresponding to the second host and (b) any substrate address which may be used to transmit communication via the substrate network toward the second overlay network address;

transmitting, by the second component associated with the second overlay network, the second set of routing information toward a third component associated with the third overlay network;

wherein the method is performed by at least one hardware device including a processor.

* * * * *

UNITED STATES PATENT AND TRADEMARK OFFICE
CERTIFICATE OF CORRECTION

PATENT NO. : 10,389,628 B2
APPLICATION NO. : 15/256361
DATED : August 20, 2019
INVENTOR(S) : Hill et al.

Page 1 of 1

It is certified that error appears in the above-identified patent and that said Letters Patent is hereby corrected as shown below:

In the Specification

In Column 2, Line 46, delete "multi-Tenant" and insert -- Multi-Tenant --, therefor.

In Column 8, Line 12, delete "FIG." and insert -- FIGS. --, therefor.

In Column 14, Line 41, delete "exposed" and insert -- exposed. --, therefor.

In the Claims

In Column 29, Line 17, in Claim 15, before "of the first" insert -- each --.

Signed and Sealed this
Twenty-fifth Day of August, 2020

Andrei Iancu
*Director of the United States Patent and Trademark Office*